(12) United States Patent
Jeong et al.

(10) Patent No.: US 8,587,754 B2
(45) Date of Patent: Nov. 19, 2013

(54) LIQUID CRYSTAL DISPLAY AND METHOD OF MANUFACTURING THE SAME

(75) Inventors: Youn Hak Jeong, Cheonan-si (KR); Jooseok Yeom, Seoul (KR); Keunchan Oh, Cheonan-si (KR); Yoonsung Um, Yongin-si (KR); Heehwan Lee, Busan (KR); Kyuwan Ryu, Seoul (KR); Jaejin Lyu, Yongin-si (KR); Myungjae Park, Suwon-si (KR)

(73) Assignee: Samsung Display Co., Ltd. (KR)

( * ) Notice: Subject to any disclaimer, the term of this patent is extended or adjusted under 35 U.S.C. 154(b) by 645 days.

(21) Appl. No.: 12/814,870

(22) Filed: Jun. 14, 2010

(65) Prior Publication Data

US 2010/0328290 A1 Dec. 30, 2010

Related U.S. Application Data

(63) Continuation-in-part of application No. 12/620,801, filed on Nov. 18, 2009, now Pat. No. 8,451,407.

(30) Foreign Application Priority Data

Jun. 30, 2009 (KR) .................. 10-2009-0059233
Mar. 30, 2010 (KR) .................. 10-2010-0028236

(51) Int. Cl.
*G02F 1/1335* (2006.01)
(52) U.S. Cl.
USPC ............... 349/114; 349/39; 349/48; 349/144
(58) Field of Classification Search
USPC ............................................... 349/48
See application file for complete search history.

(56) References Cited

U.S. PATENT DOCUMENTS

| 6,850,298 | B2 | 2/2005 | Fujimori et al. |
| 7,259,816 | B2 * | 8/2007 | Higa ............... 349/114 |
| 7,365,814 | B2 * | 4/2008 | Kang ............... 349/114 |
| 7,567,312 | B2 * | 7/2009 | Lin et al. ............ 349/48 |
| 2005/0036091 | A1 | 2/2005 | Song |
| 2005/0179839 | A1 | 8/2005 | Jung |
| 2007/0064182 | A1 | 3/2007 | Lin et al. |
| 2007/0216821 | A1 | 9/2007 | Kim et al. |
| 2009/0059135 | A1 | 3/2009 | Park et al. |

FOREIGN PATENT DOCUMENTS

| CN | 1987623 | 6/2007 |
| JP | 2007-156019 A | 6/2007 |
| JP | 2007171969 | 7/2007 |
| JP | 2009-109930 A | 5/2009 |
| KR | 1020050070975 A | 7/2005 |
| KR | 1020070066041 | 6/2007 |

* cited by examiner

*Primary Examiner* — Richard Kim
(74) *Attorney, Agent, or Firm* — Cantor Colburn LLP

(57) ABSTRACT

A liquid crystal display includes a first substrate including pixels, each having a transmissive area and a reflective area, a second substrate, and a liquid crystal layer disposed between the first and second substrates. Each of the pixels includes first and second thin film transistors which output a data signal in response to a first gate signal, a transmissive pixel electrode disposed in the transmissive area and electrically connected to the first thin film transistor to charge a first pixel voltage based on the data signal, a reflective pixel electrode disposed in the reflective area and electrically connected to the second thin film transistor to charge a second pixel voltage based on the data signal, and a voltage controller which controls the first pixel voltage and the second pixel voltage in response to a second gate signal, which is generated after the first gate signal.

9 Claims, 17 Drawing Sheets

LIQUID CRYSTAL DISPLAY AND METHOD OF MANUFACTURING THE SAME

This is a U.S. non-provisional patent application claims priority under 35 U.S.C. §119 of Korean Patent Application No. 10-2010-0028236 filed on Mar. 30, 2010, and is a Continuation-in-Part of application Ser. No. 12/620,801 filed on Nov. 18, 2009 which claims priority to Korean Patent Application No. 10-2009-0059233, filed on Jun. 30, 2009, all of which are incorporated by reference as if set forth fully herein.

BACKGROUND OF THE INVENTION

1. Field of the Invention

The present invention relates to a liquid crystal display and a method of manufacturing the liquid crystal display. More particularly, the present invention relates to a transflective liquid crystal display having a single cell gap and a method of manufacturing the liquid crystal display.

2. Description of the Related Art

A liquid crystal display ("LCD") typically includes a liquid crystal layer disposed between two transparent substrates. To display a desired image, the LCD drives the liquid crystal layer to control a transmittance of light for each pixel.

In general, an LCD is classified as either a transmissive LCD, which displays an image using a backlight unit as a light source thereof, or a reflective LCD, which displays an image using natural light as a light source thereof, e.g., without requiring a backlight unit.

Compared to the reflective LCD, the transmissive LCD, which requires the backlight unit, has a high power consumption. Although it does not require a backlight, and thus consumes less power, the reflective LCD cannot display an image if there is insufficient ambient light.

In attempts to overcome the abovementioned problems with transmissive and reflective LCDs, a transflective LCD, which has both a reflective area and a transmissive area, has recently been suggested. Since the transflective LCD operates in both reflective and transmissive modes, depending on the environment or surroundings of the LCD, the transflective LCD has relatively low power consumption, and is also able to be used in places with low ambient light.

However, the transflective LCD typically has a single cell gap structure and, as a result, a gray-scale difference occurs in the reflective and transmissive areas due to a phase retardation difference therein, thereby causing deterioration of display quality of the LCD. In contrast, when the transflective LCD has a dual cell gap structure, in which a cell gap of the transmissive area is larger than a cell gap of the reflective area, a step difference occurs between the reflective and transmissive areas. As a result, it is difficult to control a liquid crystal director, due to the step difference, and defects in patterning occur in a manufacturing process, thereby causing deterioration of both the display quality and production efficiency of the LCD.

Accordingly, it is desired to develop a transflective LCD that overcomes at least the problems discussed above.

BRIEF SUMMARY OF THE INVENTION

An exemplary embodiment of the present invention provides a transflective liquid crystal display ("LCD") having a single cell gap structure and substantially improved display quality.

Another exemplary embodiment of the present invention provides a method of manufacturing the transflective LCD.

In an exemplary embodiment of the present invention, a liquid crystal display includes a first substrate including a plurality of pixels, each of which has a transmissive area and a reflective area, a second substrate opposite to the first substrate, and a liquid crystal layer disposed between the first substrate and the second substrate.

Each pixel includes a first thin film transistor and a second thin film transistor, a transmissive pixel electrode, a reflective pixel electrode and a voltage controller. The first and second thin film transistors output a data signal in response to a first gate signal. The transmissive pixel electrode is disposed in the transmissive area and is electrically connected to the first thin film transistor to charge a first pixel voltage based on the data signal. The reflective pixel electrode is disposed in the reflective area and is electrically connected to the second thin film transistor to charge a second pixel voltage based on the data signal. The voltage controller controls the first and second pixel voltages in response to a second gate signal generated after the first gate signal.

The transmissive area has a cell gap that is equal to or larger than a cell gap of the reflective area.

According to an exemplary embodiment, each pixel further comprises a first gate line which receives the first gate signal, a second gate line which receives the second gate signal, and a data line which receives the data signal.

The voltage controller includes a third thin film transistor, a charge dividing electrode and a storage line. The third thin film transistor includes a source electrode connected to a drain electrode of the second thin film transistor and outputs a voltage control signal in response to the second gate signal. The charge dividing electrode is connected to a drain electrode of the third thin film transistor and is charged with the voltage control signal. The storage line overlaps at least a portion of the charge dividing electrode to form a first capacitor which controls the first pixel voltage and the second pixel voltage.

The first gate line is connected to a first pixel of the pixels, the second gate line is connected to a second pixel, adjacent to the first pixel, of the pixels, and the voltage controller receives the second gate signal through the second gate line.

The voltage controller may include: a third thin film transistor including a source electrode connected to the reflective pixel electrode and which outputs a voltage control signal in response to the second gate signal; a charge dividing electrode connected to a drain electrode of the third thin film transistor and which is charged with the voltage control signal; and a storage line which overlaps at least a portion of the charge dividing electrode to form a first capacitor which controls the first pixel voltage and the second pixel voltage.

The second substrate may include: a color filter layer; and a transparent organic layer disposed in a first area of the color filter layer such that a thickness of the first area is less than a thickness of a second area, different from the first area, of the color filter layer.

The second substrate may include a color filter layer, and the color filter layer may include at least one penetrating hole formed therethrough at an area corresponding to the reflective area of a corresponding pixel of the pixels.

A cell gap of the area at which the penetrating hole is formed is greater than a cell gap of another area of the color filter layer.

The second substrate may include: a common electrode which forms an electric field with the transmissive pixel electrode and the reflective pixel electrode; and at least one dividing pattern disposed on at least one of the transmissive pixel electrode, the reflective pixel area and the common electrode. The at least one dividing pattern divides the liquid crystal layer into domains.

The reflective pixel electrode may include a concavo-convex portion.

The domains have different areas.

The liquid crystal display may further include: a first polarizer disposed on an outer surface of the first substrate; a second polarizer disposed on an outer surface of the second substrate; and at least one phase retardation film disposed at least one of between the first substrate and the first polarizer and between the second substrate and the second polarizer.

At least one of the first polarizer, the second polarizer and the at least one phase retardation film may include an antiglare portion disposed thereon.

In another exemplary embodiment, a method of manufacturing a liquid crystal display is provided, the method including: forming a first substrate comprising pixels, each of which includes a transmissive area and a reflective area; forming a second substrate opposite to the first substrate; and forming a liquid crystal layer between the first substrate and the second substrate.

The forming the first substrate includes: forming a first thin film transistor, a second thin film transistor, and a third thin film transistor on a first insulating substrate disposed on the first substrate; forming a transmissive pixel electrode, connected to the first thin film transistor, in the transmissive area and; forming a reflective pixel electrode, connected to the second thin film transistor, in the reflective area; and forming a voltage controller overlapping at least a portion of the transmissive pixel electrode.

A cell gap of the transmissive area is greater than or equal to a cell gap of the reflective area.

The forming the first thin film transistor, the second thin film transistor and the third thin film transistor may include: forming a first gate line and a second gate line on the first substrate; forming a data line which crosses the first gate line and the second gate line on the first substrate; interposing a gate insulating layer between the data line and each of the first gate line and the second gate line; forming the first thin film transistor and the second thin film transistor connected to the first gate line and the data line, respectively; and forming the third thin film transistor connected to a drain electrode of the second thin film transistor and the second gate line.

The forming the voltage controller includes: forming a storage line, spaced apart from and insulated from the first gate line and the second gate line, on the first substrate; forming a charge dividing electrode, connected to the third thin film transistor and which overlaps at least a portion the storage line, on the first substrate; and interposing the gate insulating layer between the charge dividing electrode and the storage line.

The charge dividing electrode overlaps at least a portion of the transmissive pixel electrode, and a protective layer is interposed between the charge dividing electrode and the at least a portion of the transmissive pixel electrode.

The preparing the second substrate may include: forming a common electrode, configured to form an electric field with the transmissive pixel electrode and the reflective pixel electrode, on a second insulating layer; and forming at least one dividing pattern in the common electrode. The forming the first substrate may further include forming at least one dividing pattern in at least one of the transmissive pixel electrode and the reflective pixel electrode.

The forming the first thin film transistor, the second thin film transistor and the third thin film transistor may include: forming a first gate line and a second gate line on the first substrate; forming a data line which crosses the first gate line and the second gate line on the first substrate; interposing a gate insulating layer between the data line and both the first gate line and the second gate line; and connecting the first thin film transistor and the second thin film transistor to the first gate line and the data line; and connecting the third thin film transistor to the transmissive pixel electrode and the second gate line.

The forming the voltage controller includes: comprises forming a storage line, spaced apart from and insulated from the first gate line and the second gate line, on the first substrate; forming a charge dividing electrode, connected to the third thin film transistor and which overlaps at least a portion of the storage line, on the first substrate; and interposing the gate insulating layer between the charge dividing electrode and the storage line.

The charge dividing electrode overlaps at least a portion of the transmissive pixel electrode, and a protective layer is interposed between the charge dividing electrode and the at least a portion of the transmissive pixel electrode.

The forming the second substrate includes: forming a common electrode, configured to form an electric field with the transmissive pixel electrode and the reflective pixel electrode, on a second insulating layer; and forming at least one dividing pattern in the common electrode. The forming the first substrate may further include forming at least one dividing pattern in at least one of the transmissive pixel electrode and the reflective pixel electrode.

In yet another exemplary embodiment, a liquid crystal display includes: a first substrate comprising pixels, each of which includes a transmissive area and a reflective area; a second substrate facing the first substrate; and a liquid crystal layer disposed between the first substrate and the second substrate.

Each pixel includes: a first thin film transistor which outputs a first data signal in response to a gate signal; a second thin film transistor which outputs a second data signal in response to the gate signal; a transmissive pixel electrode disposed in the transmissive area and connected to the first thin film transistor, and which charges a first pixel voltage in response to the first data signal; and a reflective pixel electrode disposed in the reflective area and connected to the second thin film transistor and which charges a second pixel voltage in response to the second data signal.

The second substrate includes: a common electrode which forms an electric field with the transmissive pixel electrode and the reflective pixel electrode; and at least one dividing pattern disposed on at least one of the transmissive pixel electrode, the reflective pixel electrode and the common electrode to divide the liquid crystal layer into domains.

A cell gap of the transmissive area is greater than or equal to a cell gap of the reflective area.

The liquid crystal display may further include: a first sub-thin film transistor which outputs a first sub-data signal in response to the gate signal; and a voltage controller connected to the first sub-thin film transistor.

The transmissive pixel electrode includes: a first transmissive pixel electrode connected to a drain electrode of the first thin film transistor to charge a first transmissive pixel voltage; and a second transmissive pixel electrode spaced apart from the first transmissive pixel electrode and connected to the first sub-thin film transistor to charge a second transmissive pixel voltage. The voltage controller controls the first transmissive pixel voltage and the second transmissive pixel voltage in response to a next gate signal of a next pixel generated after the gate signal.

Thus, according to the exemplary embodiments described herein, a liquid crystal layer corresponding to a transmissive area is driven by a voltage different from a voltage used to drive a liquid crystal layer corresponding to a reflective area, and a phase retardation value of the reflective area is matched with a phase retardation value of the transmissive area. Thus, a gray-scale difference between the transmissive area and the reflective area is substantially reduced and deterioration of electro-optical characteristic of the liquid crystal layer is effectively prevented, thereby greatly improving a display quality of the liquid crystal display. In addition, the liquid crystal display according to an exemplary embodiment has a signal cell gap, and thus does not require the same patterning processes used to manufacture a liquid crystal display having a dual cell gap. As a result, a manufacturing process for the liquid crystal display is simplified, and manufacturing process defects are substantially reduced and/or effectively prevented.

BRIEF DESCRIPTION OF THE DRAWINGS

The above and other aspects and features of the present invention will become more readily apparent by describing in further detail exemplary embodiments thereof with reference to the accompanying drawings, in which.

DETAILED DESCRIPTION OF THE INVENTION

Figure 1:
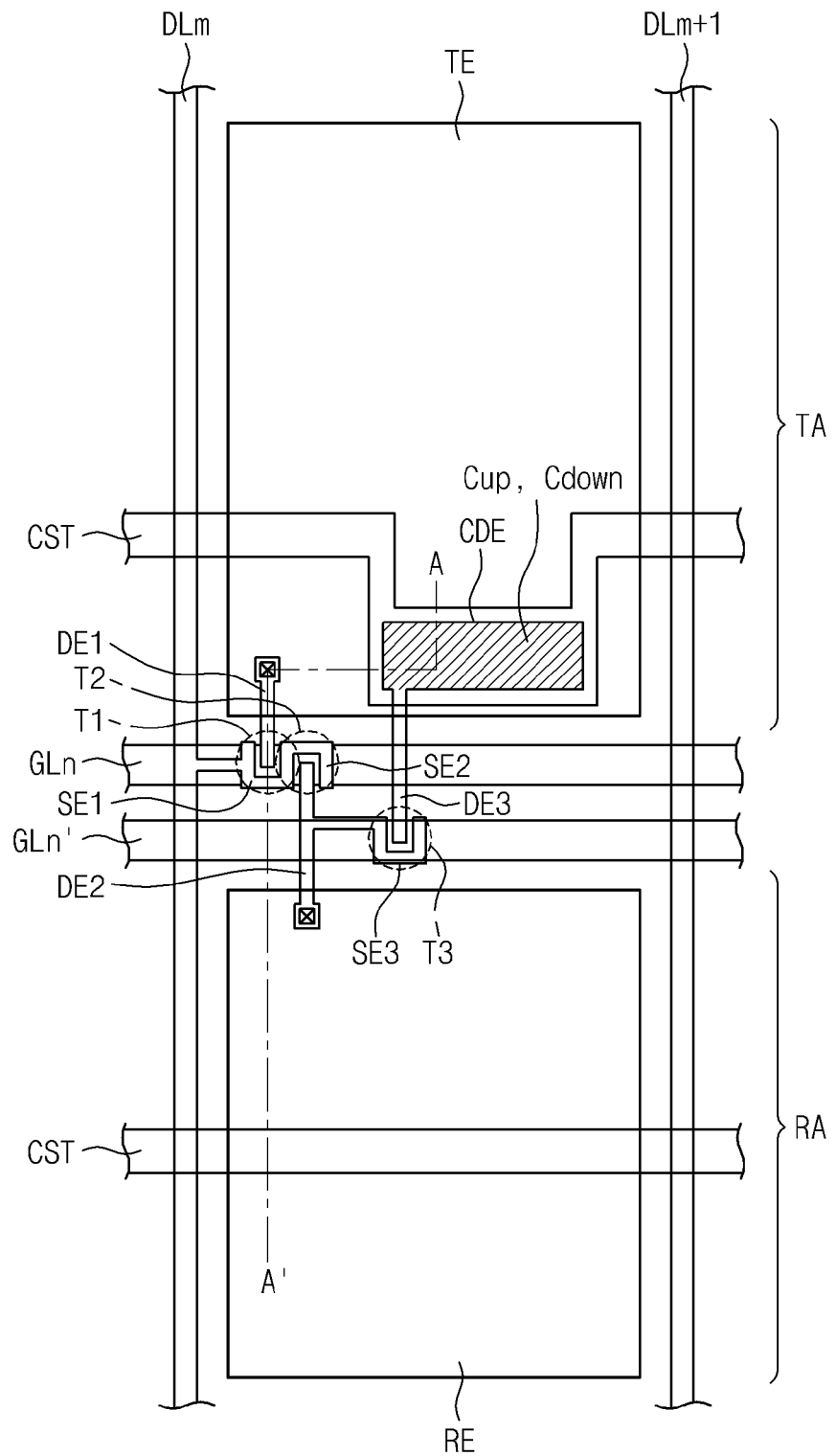
FIG. 1 is a plan view of an exemplary embodiment of a liquid crystal display ("LCD") according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the present invention will be described in further detail with reference to the accompanying drawings.

Figure 2:
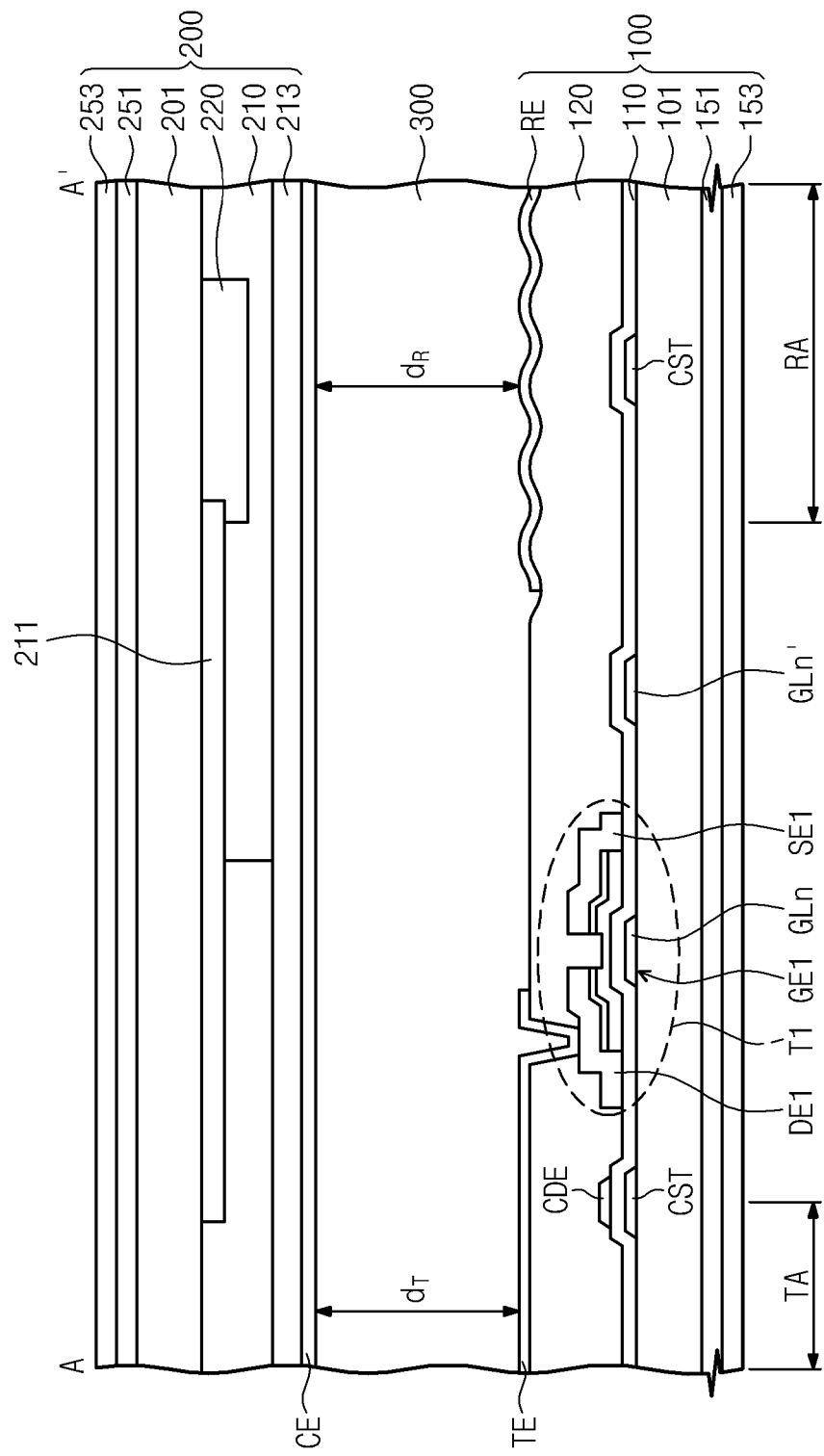
FIG. 2 is a partial cross-sectional view taken along line A-A' of FIG. 1.

FIG. 1 is a plan view of an exemplary embodiment of a liquid crystal display ("LCD") according to the present invention, and FIG. 2 is a partial cross-sectional view taken along line A-A' of FIG. 1.

Referring to FIGS. 1 and 2, a liquid crystal display includes a first substrate 100, a second substrate 200 disposed opposite to, e.g., facing, the first substrate 100 and a liquid crystal layer 300 disposed between the first substrate 100 and the second substrate 200.

The first substrate 100 includes a first insulating substrate 101 including pixels, each of which having a reflective area RA and a transmissive area TA. The first insulating substrate 101 includes N gate lines $GL_1, \ldots, GL_n, GL_{n+1}, \ldots, GL_N$, N sub-gate lines $GL_1', \ldots, GL_n', GL_{n+1}', \ldots, GL_N'$ disposed substantially parallel and correspondingly to the N gate lines, and M data lines $DL_1, \ldots, DL_m, DL_{m+1}, \ldots, DL_M$, and each pixel includes one gate line GL of the N gate lines $GL_1, \ldots, GL_n, GL_{n+1}, \ldots, GL_N$, one sub-gate line GL' of the N sub-gate lines $GL_1', \ldots, GL_n', GL_{n+1}', \ldots, GL_N'$, and one data line DL of the M data lines $DL_1, \ldots, DL_m, DL_{m+}, \ldots, DL_M$. Hereinafter, for purposes of explanation, one pixel having an n-th gate line $GL_n$, an n-th sub-gate line $GL_n'$ and an m-th data line $DL_m$ will be described in further detail in conjunction with an (m+1)th data line $DL_{m+1}$, as shown in FIG. 1, but it will be noted that alternative exemplary embodiments are not limited. In an exemplary embodiment, each pixel has substantially the same structure and function as the other pixels in the LCD.

Referring to FIGS. 1 and 2, on the first substrate 100, the pixel includes the n-th gate line $GL_n$, the n-th sub-gate line $GL_n'$, a first gate electrode GE1 the n-th gate line $GL_n$, and a storage line CST disposed on the first insulating substrate 101.

The first insulating substrate 101 is formed of a transparent material, such as glass, for example. The n-th gate line $GL_n$ is disposed on the first insulating substrate 101 and extends along a first direction (e.g., along a horizontal or row direction, as viewed in FIG. 1). The n-th sub-gate line $GL_n'$ is disposed substantially parallel to the n-th gate line $GL_n$ and is spaced apart from the n-th gate line $GL_n$. The first gate electrode GE1 may branch from the n-th gate line $GL_n$ along a second direction, e.g., a horizontal or column direction (as viewed in FIG. 1) substantially perpendicular to the first direction. However, in an exemplary embodiment, the first gate electrode GE1 is disposed on at least a portion of the n-th gate line $GL_n$. The storage line CST is spaced apart from the n-th gate line $GL_n$ and the n-th sub-gate line $GL_n'$ and is disposed substantially parallel to the n-th gate line $GL_n$ and the n-th sub-gate line $GL_n'$. In addition, a portion (not shown) of the storage line CST may extend along a different direction to overlap at least a portion of a data line DL of a corresponding pixel. The storage line CST may be disposed in each of the transmissive area TA and the reflective area RA.

The m-th data line $DL_m$, the first gate electrode G1, a first source electrode SE1, a first drain electrode DE1, a second source electrode SE2, a second drain electrode DE2, a third source electrode SE3, a third drain electrode DE3 and a charge dividing electrode CDE are disposed on the first insulating substrate 101 on which the n-th gate line $GL_n$ is disposed.

The m-th data line $DL_m$ crosses the n-th gate line $GL_n$ and extends along the second direction (substantially perpendicular to the first direction). An insulating layer 110 is interposed between the m-th data line $DL_m$ and the n-th gate line $GL_n$, as shown in FIG. 2. The first source electrode SE1 and the second source electrode SE2 branch from the m-th data line $DL_m$ to partially overlap the n-th gate line $GL_n$. The first drain electrode DE1 and the second drain electrode DE2 are spaced apart from the first source electrode SE1 and the second source electrode SE2, respectively, to partially overlap the n-th gate line $GL_n$. The third source electrode SE3 branches from the second drain electrode DE2 to partially overlap the n-th sub-gate line $GL_n'$. The third drain electrode DE3 is spaced apart from the third source electrode SE3 to partially overlap the n-th sub-gate line $GL_n'$. The charge dividing electrode CDE overlaps at least a portion of the storage line CST of the transmissive area TA.

A transmissive pixel electrode TE and a reflective pixel electrode RE are disposed on the first through third source electrodes SE1, SE2 and SE3, respectively, and the first through third drain electrodes DE1, DE2 and DE3, respectively, and a protective layer 120 is interposed therebetween. The transmissive pixel electrode TE, which includes a transparent conductive material, is disposed in the transmissive area TA and is connected to the first drain electrode DE1 through a contact hole formed through the protective layer 120. The reflective pixel electrode RE, which includes a non-transparent conductive material, is disposed in the reflective area RA and is connected to the second drain electrode DE2 through a contact hole formed through the protective layer 120. In an exemplary embodiment, the reflective pixel electrode RE may be disposed only with the non-transparent conductive material layer. Additionally, the reflective pixel electrode RE may be formed by forming the non-transparent conductive material layer on and/or under the transparent conductive material layer that forms the transmissive pixel electrode TE, and thereafter patterning the non-transparent conductive material layer to form a multilayer structure. The reflective pixel electrode RE may be formed to have a concavo-convex portion on a surface thereof (as shown in FIG. 2) such that the reflective pixel electrode RE has a high reflectance. The concavo-convex portion may be integrally formed with the reflective pixel electrode RE or, alternatively, may be formed by patterning the protective layer 120 under the reflective pixel electrode RE. When a width of one concavo-convex pattern of the concavo-convex portion is defined as a pitch thereof, the pitch may be about 4 micrometers (μm) to about 5 μm, and a distance between a most recessed portion and a most protruded portion (relative to a plane defined by an outer surface of the protective layer 120 or the reflective pixel electrode RE, as viewed along the vertical direction in FIG. 2) may be about 0.5 μm to about 2.5 μm.

As described above, a portion of the n-th gate line $GL_n$, e.g., the first gate electrode GE1, the first source electrode SE1 and the first drain electrode DE1 form a first thin film transistor T1. Likewise, a portion of the n-th gate line $GL_n$, e.g., a second gate electrode (not shown), the second source electrode SE2, and the second drain electrode DE2 form a second thin film transistor T2, and a portion of the n-th sub-gate line $GL_n'$, e.g., a third gate electrode (not shown), the third source electrode SE3, and the third drain electrode DE3 form a third thin film transistor T3. The third thin film transistor T3, the charge dividing electrode CDE connected to the third drain electrode DE3 of the third thin film transistor T3, and the storage line CST form a voltage controller.

Referring still to FIGS. 1 and 2, the second substrate 200 includes a second insulating substrate 201. In addition, a transparent organic layer 220, a light-blocking layer 211, a color filter layer 210 and a common electrode CE are disposed on the second insulating substrate 201.

The transparent organic layer 220 has a predetermined thickness in one area proximate to the second insulating substrate 201. The light-blocking layer 211 prevents light from leaking and thus includes a non-transparent material that absorbs light. The color filter layer 210 covers the area in which the transparent organic layer 220 is disposed and a remaining area in which the transparent organic layer 220 is not disposed. The transparent organic layer 220 and the color filter layer 210 will be described in greater detail below.

The common electrode CE is disposed on the color filter layer 210 while an insulating layer 213 is disposed therebetween and forms an electric field with the transmissive pixel electrode TE and the reflective pixel electrode RE to drive the liquid crystal layer 300.

A first polarizer 153 and a second polarizer 253 that has a polarizing axis substantially perpendicular to a polarizing axis of the first polarizer 153 are disposed on outer surfaces of the first insulating substrate 101 and the second insulating substrate 201, respectively. A phase retardation film may be disposed between the first insulating substrate 101 and the first polarizer 153 and/or between the second insulating substrate 201 and the second polarizer 253. For example, in the exemplary embodiment shown in FIG. 2, a phase retardation film 151 and a phase retardation film 251 are disposed on surfaces of the first insulating substrate 101 and the second insulating substrate 201, respectively, but alternative exemplary embodiments are not limited thereto. For example, in other exemplary embodiments, the phase retardation films 151 and/or 251 may be not be included on the first insulating substrate 101 and/or the second insulating substrate 201, respectively, such as when since a phase retardation value is compensated by applying voltages having different voltage levels to the transmissive area TA and the reflective area RA, for example.

An anti-glare part (not shown) may be disposed on at least one surface of each of the first polarizer 153, the second polarizer 253 and the phase retardation films 151 and 251 to prevent rainbow defects, such as when the concavo-convex portion of the reflective pixel electrode RE is disposed on the reflective pixel electrode RE itself, since the rainbow defects may occur due to reflected lights from the concavo-convex portion, which may interfere with each other.

In the anti-glare part, for example, non-conductive fine particles like silica or conductive fine particles like gold are unevenly dispersed, to substantially reduce interference between the reflected lights. The non-conductive fine particles or the conductive fine particles may have a diameter equal to or less than about 40 μm. The anti-glare part may have a haze value, which is defined as a percentage ratio of scattered light and total transmitted light, of about 5 percent (%) to about 70%.

In an exemplary embodiment, a distance between the first substrate 100 and the second substrate 200 in the transmissive area TA is substantially equal to a distance between the first substrate 100 and the second substrate 200 in the reflective area RA. Put another way, the transmissive area TA and the reflective area RA may have a single cell gap. More specifically, when the concavo-convex portion is disposed on the reflective pixel electrode RE (as shown in FIG. 2) after performing a patterning process to form the concavo-convex portion, a cell gap $d_R$ of the reflective are RA, in which the reflective pixel electrode RE is formed, may become slightly larger than a cell gap $d_T$ of the transmissive area TA, in which the transmissive pixel electrode TE is formed. However, since the difference between the cell gaps $d_R$ and $d_T$ is small (relative to a value of the cell gaps $d_R$ and $d_T$ themselves, for example), the transmissive area TA and the reflective area RA effectively have a single cell gap.

Figure 3:
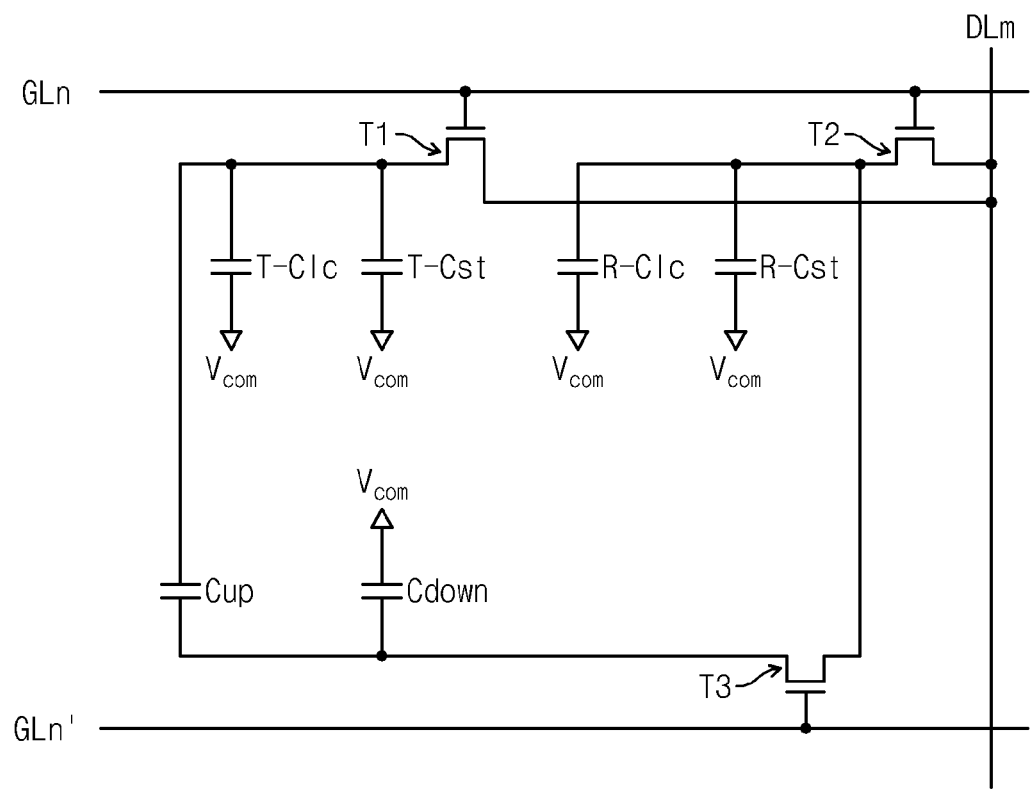
FIG. 3 is an equivalent circuit diagram of a pixel of the liquid crystal display of FIG. 1.
Figure 4:
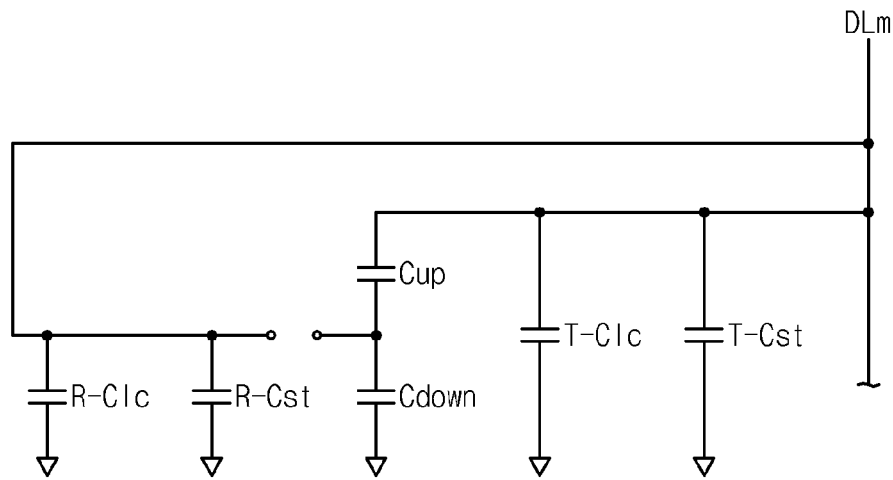
FIG. 4 is an equivalent circuit diagram of an n-th pixel when a gate signal is applied to an n-th gate line of the pixel of FIG. 3.

FIG. 3 is an equivalent circuit diagram showing a pixel of the liquid crystal display of FIG. 1, and FIG. 4 is an equivalent circuit diagram showing an n-th pixel when a gate signal is applied to the n-th gate line $GL_n$ of the pixel FIG. 3.

Hereinafter, an exemplary embodiment of a method of driving a liquid crystal display will be described in further detail with reference to FIGS. 1 through 4.

A first liquid crystal capacitor T-Clc, a second liquid crystal capacitor R-Clc, a first storage capacitor T-Cst, and a second storage capacitor R-Cst are disposed in the pixel having the first and second thin film transistors T1 and T2, respectively.

More particularly, the first thin film transistor T1 includes the first gate electrode GE1 connected to the n-th gate line $GL_n$, the first source electrode SE1 connected to the m-th data line $DL_m$, and the first drain electrode DE1 connected to the first liquid crystal capacitor T-Clc. The first liquid crystal capacitor T-Clc is formed by the transmissive pixel electrode TE connected to the first drain electrode DE1, the common electrode CE facing the transmissive pixel electrode TE and which receives a common voltage Vcom, and the liquid crystal layer 300 disposed between the transmissive pixel electrode TE and the common electrode CE. The first storage capacitor T-Cst is formed by the transmissive pixel electrode TE, the storage line CST to which the common voltage Vcom is applied, and the insulating layer 110 and the protective layer 120, which are interposed between the transmissive pixel electrode TE and the storage line CST.

The second thin film transistor T2 includes a second gate electrode connected to the n-th gate line $GL_n$, the second source electrode SE2 connected to the m-th data line $DL_m$, and the second drain electrode DE2 connected to the second liquid crystal capacitor R-Clc. The second liquid crystal capacitor R-Clc is formed by the reflective pixel electrode RE connected to the second drain electrode DE2, the common electrode CE facing the reflective pixel electrode RE and which receives the common voltage Vcom, and the liquid crystal layer 300 disposed between the reflective pixel electrode RE and the common electrode CE. The second storage capacitor R-Cst is formed by the reflective pixel electrode RE, the storage line CST to which the common voltage Vcom is applied, and the insulating layer 110 and the protective layer 120, which are interposed between the reflective pixel electrode RE and the storage line CST.

A gate signal is applied to the n-th gate line $GL_n$, and a data signal is applied to the m-th data line $DL_m$. When the first and second thin film transistors T1 and T2, respectively, are turned on in response to the gate signal applied through the n-th gate line $GL_n$, the data signal is applied to the transmissive pixel electrode TE and the reflective pixel electrode RE through the first and second thin film transistors T1 and T2.

Referring to FIGS. 3 and 4, when the gate signal is applied to the n-th gate line $GL_n$, the first and second thin film transistors T1 and T2 are turned on. Thus, the data signal applied to the m-th data line $DL_m$ is provided to the transmissive pixel electrode TE and the reflective pixel electrode RE of the first and second liquid crystal capacitors T-Clc and R-Clc through the first and second thin film transistors T1 and T2, respectively. In this case, since the signals applied to the transmissive pixel electrode TE and the reflective pixel electrode RE of the first and second liquid crystal capacitors T-Clc and R-Clc are identical, the first and second liquid crystal capacitors T-Clc and R-Clc are charged with a first pixel voltage and a second pixel voltage, respectively, which have a same voltage level.

The pixel further includes the n-th sub-gate line $GL_n'$ and the third thin film transistor T3, and the third thin film transistor T3 controls a voltage level of the first and second pixel voltages charged in the transmissive pixel electrode TE and the reflective pixel electrode RE, respectively.

The third thin film transistor T3 includes a third gate electrode connected to the n-th sub-gate line $GL_n'$, the third source electrode SE3 connected to the reflective pixel electrode RE and the third drain electrode DE3 connected to a down-capacitor Cdown and an up-capacitor Cup.

As shown in FIG. 2, the down-capacitor Cdown is formed by the storage line CST, the charge dividing electrode CDE connected to the third drain electrode DE3 and which partially overlaps the storage line CST, and the insulating layer 110 interposed between the charge dividing electrode CDE and the storage line CST. The up-capacitor Cup is formed by the transmissive pixel electrode TE, the charge dividing electrode CDE that partially overlaps the transmissive pixel electrode TE, and the protective layer 120 interposed between the charge dividing electrode CDE and the transmissive pixel electrode TE.

The third thin film transistor T3 is turned on in response to a gate signal applied to the n-th sub-gate line $GL_n'$ to output a voltage control signal after the gate signal is applied to the n-th gate line $GL_n$. Thus, the reflective pixel electrode RE is electrically connected to the charge dividing electrode CDE by the third thin film transistor T3. Consequently, the voltage level of the first pixel voltage charged in the first liquid crystal capacitor T-Clc and the voltage level of the second pixel voltage charged in the second liquid crystal capacitor R-Clc is controlled by the up-capacitor Cup and the down-capacitor Cdown. Specifically, the voltage level of the first pixel voltage increases and the voltage level of the second pixel voltage decreases due to the up-capacitor Cup and the down-capacitor Cdown. An amount of increase and decrease in the first and second pixel voltages, respectively, depends capacitances of the up-capacitor Cup and the down-capacitor Cdown.

Thus, different voltages may be applied to the transmissive pixel electrode TE and the reflective pixel electrode RE by forming the voltage controller, as described above.

Figure 5:
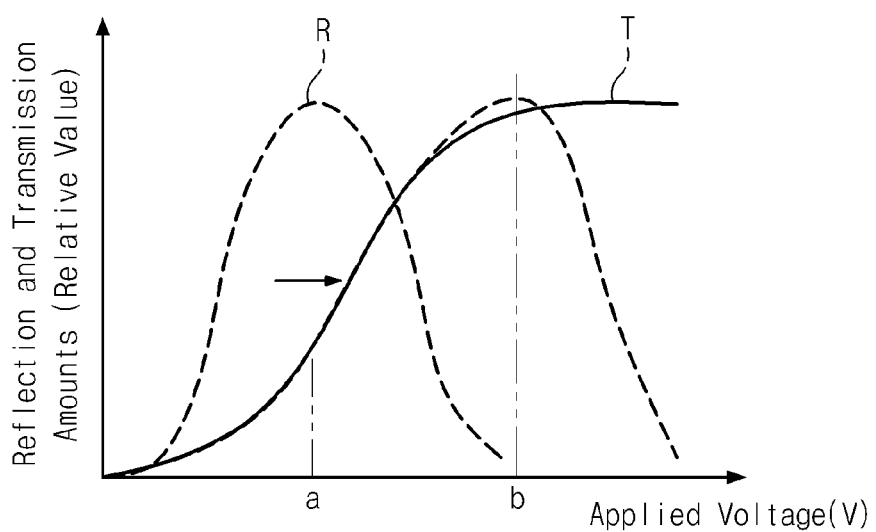
FIG. 5 is a graph of reflection and transmission versus applied voltage illustrating an exemplary embodiment of a method of controlling a light transmission amount and a light reflection amount in the liquid crystal display of FIG. 1.

FIG. 5 is a graph of relative values of reflection transmission versus voltage, in volts (V), illustrating an exemplary embodiment of a method of controlling a light transmission amount and a light reflection amount according to applied voltages for a single cell gap in the liquid crystal display of FIG. 1. In FIG. 5, a structure in which the phase retardation films 151 and 251 are interposed between the first insulating substrate 101 and the first polarizer 153 and between the second insulating substrate 201 and the second polarizer 253, respectively, will be described, but it will be noted that additional exemplary embodiments are not limited thereto. In an exemplary embodiment, each of the phase retardation films 151 and 251 serves as a compensation film having a wavelength $\lambda$ of about 550 nanometers (nm) and a retardation value Ro of $\lambda/4$ or, alternatively, $\lambda/4+\lambda/2$.

Referring to FIG. 5, in an exemplary embodiment, the reflective area RA and the transmissive area TA are driven in normally-black mode, and a light reflection amount of the reflective area RA and the light transmission amount of the transmissive area TA have different values according to voltages applied to the reflective pixel electrode RE and the transmissive pixel electrode TE. As a result, a reflection curve R does not match a transmission curve T. For example, a first applied voltage value (a) when the light reflection amount is at maximum is less than an applied voltage value (b) when the light transmission amount is at maximum. Therefore, when the same voltages are applied to the reflective pixel electrode RE and the transmissive pixel electrode TE, it is difficult to match the gray-scale in the reflective area RA with the gray-scale in the transmissive area TA.

Thus, in an exemplary embodiment, the first pixel voltage and the second pixel voltage that are applied to the transmissive pixel electrode TE and the reflective pixel electrode RE, respectively, are controlled by the voltage controller, described in greater detail above, such that the reflection curve R is substantially identically matched to the transmission curve T, as shown by the right-shifted reflection curve R in FIG. 5. Specifically, when the voltage controller lowers the voltage level of the second pixel voltage, the voltage level of a voltage applied to the liquid crystal layer 300 corresponding to the reflective area RA decreases, and the reflection curve R moves to the right, as shown in FIG. 5. Therefore, the reflection curve R may be substantially identically matched to the transmission curve T, e.g., may be substantially the same as the transmission curve T. As a result, the gray-scale of the reflective area RA is substantially identically matched with the gray-scale of the transmission area RA by applying the voltages having the same voltage level. It will be noted that other exemplary embodiments are not limited to the method of adjusting the transmission curve T as shown in FIG. 5. Specifically, for example, the transmission curve T may be adjusted by decreasing the voltage level of the second pixel voltage or, alternatively, by increasing the voltage level of the first pixel voltage (not shown).

When the phase retardation film is not included, the gray-scale of the transmissive area TA may be matched with the gray-scale of the reflective area RA by controlling the first and second pixel voltages. Specifically, for example, when the phase retardation film is not included, the reflective area RA may be driven in normally-white mode and the transmissive area TA may be driven in normally-black mode. However, the gray-scale of the transmissive area TA is matched to the gray-scale of the reflective area RA by controlling the first and second pixel voltages applied to the transmissive area TA and the reflective area RA, respectively.

The first pixel voltage and the second pixel voltage may have different values, based on the cell gap difference (described above) between the reflective area RA and the transmissive area TA. For example, when the first pixel voltage is about 1 volt (V) and the cell gap $d_R$ (FIG. 2) of the reflective area RA is less than the cell gap $d_T$ of the transmissive area TA, the second pixel voltage may be about 0.4 V to about 1 V. When the cell gap $d_R$ of the reflective area RA is the same as the cell gap $d_T$ of the transmissive area TA, the second pixel voltage may be about 0.3 V to about 0.8 V. In addition, when the cell gap $d_R$ of the reflective area RA is larger than the cell gap $d_T$ of the transmissive area TA, the second pixel voltage may be about 0.2 V to about 0.7 V.

That is, an alignment direction of liquid crystal molecules in the liquid crystal layer 300 is controlled according to voltages applied to the transmissive area TA and the reflective area RA. As a result, phase retardation values of light passing through the liquid crystal layer 300 corresponding to the transmissive area TA and the reflective area RA are effectively controlled to have a same value, thereby matching the gray-scale in the transmissive area TA with the gray-scale in the reflective area RA in an LCD having a signal cell gap. In addition, since the light provided to the reflective area RA successively travels through the second insulating substrate 201, the color filter layer 210, the insulating layer 213, the common electrode CE, the liquid crystal layer 300, the reflective pixel electrode RE, the liquid crystal layer 300, the common electrode CE, the insulating layer 213, the color filter layer 210, and the second insulating substrate 201, the light passes through the liquid crystal layer 300 and the color filter layer 210 two times. In contrast, the light provided to the transmissive area TA successively travels through the first insulating substrate 101, the insulating layer 110, the protective layer 120, the transmissive pixel electrode TE, the liquid crystal layer 300, the common electrode CE, the insulating layer 213, the color filter layer 210, and the second insulating substrate 201, and thus the light passes through the liquid crystal layer 300 and the color filter layer 210 only one time. Therefore, when the light travels through the liquid crystal layer 300 and the color filter layer 210 two times, of which a light absorbance is relatively higher than other materials, parts of the light provided to the reflective area RA is absorbed by the liquid crystal layer 300 and the color filter layer 210, so that the amount of the light exiting through the reflective area RA may decrease. Accordingly, a light amount difference may occur between the lights traveling through the reflective area RA and the transmissive area TA, and the gray-scales of the reflective and transmissive areas RA and TA are not matched with each other.

Thus, in an exemplary embodiment, the transparent organic layer 220 is disposed in an area of the color filter layer 210 corresponding to the reflective area RA, such that the light amount of the light traveling through the reflective area RA may increase and the difference in the light amount between the reflective and transmissive areas RA and TA may be minimized.

The transparent organic layer 220 has the predetermined thickness proximate to the area of the second insulating substrate 201. The transparent organic layer 220 includes an organic material having a light absorbance less than that a light absorbance of the color filter layer 210. The transparent organic layer 220 is disposed on the second insulating substrate 201 to correspond to the reflective area RA of the first substrate 100.

The color filter layer 210 covers the area where the transparent organic layer 220 is disposed and a remaining area where the transparent organic layer 220 is not disposed. The color filter layer 210 is disposed on the second insulating substrate 201 and includes materials that produce red, blue, green and white colors, for example, to display colors during the light passing therethrough. In an exemplary embodiment, since the transparent organic layer 220 is formed to have the predetermined thickness in the area where the color filter layer 210 is disposed, a thickness of the color filter layer 210 in the area where the transparent organic layer 220 is disposed becomes thinner than a thickness of the color filter layer 210 in the remaining area where the transparent organic layer 220 is not disposed after forming the color filter layer 210. The area where the color filter layer 210 has a relatively thin thickness has a light absorbance less than the area where the color filter layer 210 has a relatively thick thickness. Thus, the light traveling through the area has a higher light amount than that of the light traveling through the remaining area, to thereby compensate for the difference between the amount of light passing through the transmissive area TA, which has a relatively high light amount, and the amount of light passing through the reflective area RA, which has a relatively low light amount. Accordingly, the amounts of light in the reflective area RA and the transmissive area TA are uniform.

In an exemplary embodiment, the transparent organic layer 220 is disposed on the color filter layer 210 to improve the light amount of the reflective area RA, however, alternative exemplary embodiments are not limited thereto. For example, instead of forming the transparent organic layer 220 as described above, a penetrating hole 220', through which light easily passes, may be formed in the color filter layer 210, as shown in FIG. 6, which will now be described in further detail.

Figure 6:
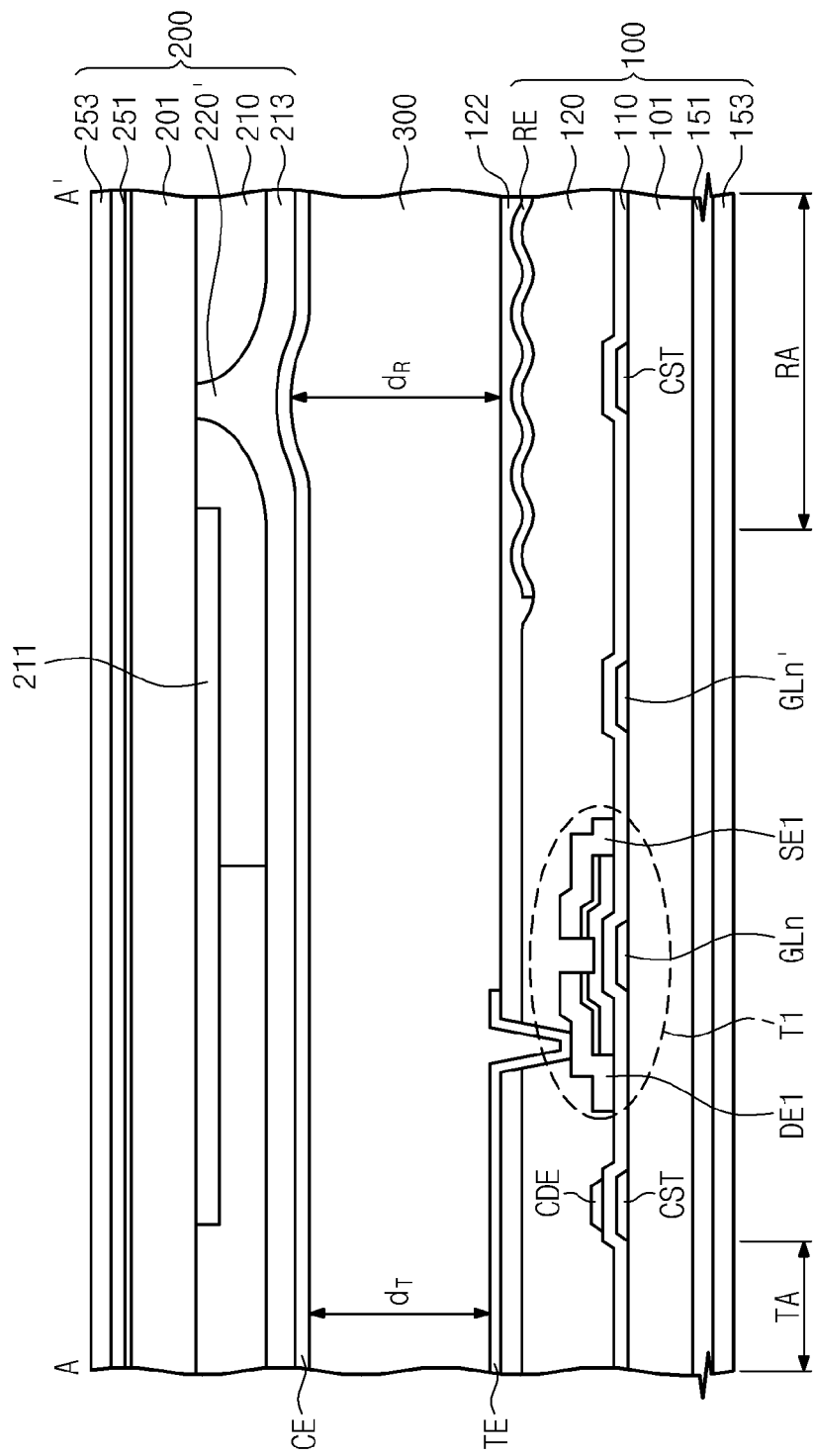
FIG. 6 is a partial cross-sectional view of another exemplary embodiment of a liquid crystal display according to the present invention.

FIG. 6 is a partial cross-sectional view of an exemplary embodiment of a liquid crystal display according to the present invention. More particularly, FIG. 6 shows a color filter layer 210 through which the penetrating hole 220' is formed. In FIG. 6, the same reference characters denote the same or like components as described in greater detail above with reference to FIGS. 1 through 5; accordingly, any repetitive detailed description thereof will hereinafter be simplified or omitted.

In an exemplary embodiment, the penetrating hole 220', which exposes at least a portion of a second insulating substrate 201, is formed in a color filter layer 210 corresponding to a reflective area RA, to improve a light amount of a light passing through the reflective area RA. In one or more exemplary embodiments, a plurality of the penetrating holes 220' may be formed. Since the color filter layer 210 is not disposed in the area through which the penetrating hole 220' is formed, the light directly passes through the penetrating hole 220' without passing through the color filter layer 210. Therefore, no light is absorbed by the color filter layer 210 and the light amount of the light increases. The penetrating hole 220' is not disposed in a remaining area of the color filter layer 210 except for the area where the penetrating hole 220' is formed of the color filter layer 210, and the light passes through the remaining area of the color filter layer 210, to thereby display colors. As a result, the light amount of the light may be improved without decreasing color reproducibility.

An insulating layer 213 is disposed on the color filter layer 210, in which the penetrating hole 220' is formed, and the color filter layer 210 is not disposed in the area in which the penetrating hole 220' is formed. Thus, an upper surface of the insulating layer 213 has a substantially concave shape in the area in which the penetrating hole 220' is formed. When the penetrating hole 220' is formed in the color filter layer 210, the cell gap $d_R$ of the reflective area RA becomes greater than or equal to the cell gap $d_T$ of the transmissive area TA since a cell gap of the area in which the penetrating hole 220' is formed becomes larger than a cell gap of the remaining area.

In an exemplary embodiment, a planarization layer 122 is disposed on the reflective pixel electrode RE. The transmissive pixel electrode TE is disposed on the planarization layer 122.

The planarization layer 122 is disposed in order to decrease a spot defect caused by the concavo-convex portion of the transmissive pixel electrode TE. The planarization layer planarizes a surface of the first substrate 100 and, as a result, liquid crystal molecules included in the liquid crystal layer 300 are effectively prevented from becoming misaligned due a height difference in the concavo-convex portion.

FIGS. 7A through 7E are plan views of additional exemplary embodiments of a liquid crystal display according to the present invention. In FIGS. 7A through 7E, the same reference characters denote the same or like components as described in greater detail above with reference to the previous drawings; accordingly, any repetitive detailed description thereof will hereinafter be simplified or omitted. Referring now to FIGS. 7A through 7E, a transmissive pixel electrode TE, a reflective pixel electrode RE and a common electrode CE will be described in further detail.

In FIGS. 7A through 7E, the transmissive pixel electrode TE and the reflective pixel electrode RE have a predetermined area, but exemplary embodiments are not limited thereto. For example, the transmissive pixel electrode TE and the reflective pixel electrode RE may be also provided with various area ratios. An area ratio of the transmissive pixel electrode TE and the reflective pixel electrode RE may be 7:3 in effective aperture area of each pixel except an area of the light-blocking layer 211. Preferably, assuming the effective aperture area of each pixel except the light-blocking layer 211 being 100% of a pixel area, the reflective pixel electrode RE may have an area of about 30% of the pixel area or more. This is because a luminance of the transflective LCD rarely increases even though direct light from the sun increases if the reflective pixel has an area under 30% of the pixel area.

In an LCD according to one or more exemplary embodiments, at least one dividing pattern is formed on a transmissive pixel electrode TE, a reflective pixel electrode RE, and a common electrode CE to divide a liquid crystal layer 300 into a plurality of domains, to thereby substantially improve a viewing angle of the LCD. The domains may have the same area or, alternatively, different areas.

The dividing pattern is formed on at least one of the transmissive pixel electrode TE, the reflective pixel electrode RE and the common electrode CE, and the dividing pattern may have a slit shape (hereinafter, referred to as a slit portion) when viewed from above a plan view of the LCD, an embossed shape (hereinafter, referred to as an embossed portion) and/or a hole shape (hereinafter, referred to as a hole portion) to control a director of a liquid crystal, but exemplary embodiments are not limited thereto. In another exemplary embodiment, the embossed portion E1 forms a pyramidal pattern or a hemispheric pattern.

Figure 7A:
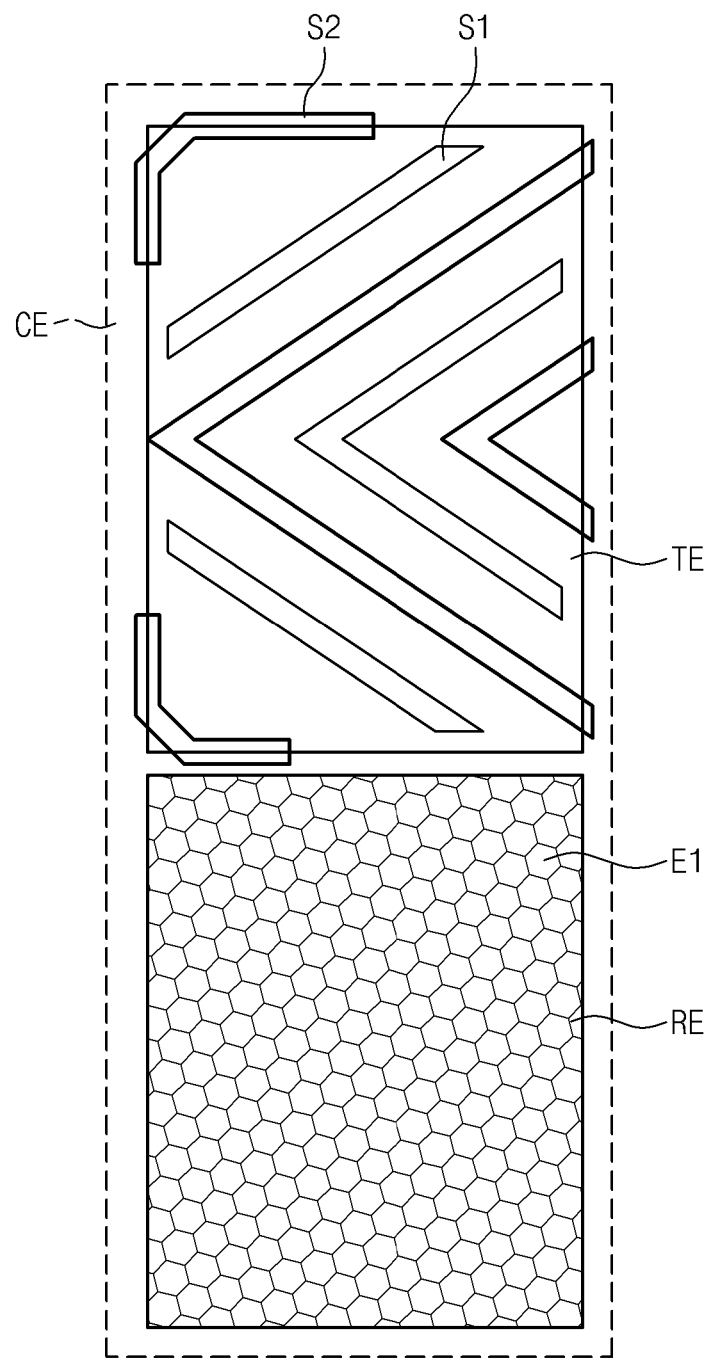
FIGS. 7A through 7E are plan views of additional exemplary embodiments of a liquid crystal display according to the present invention.

Referring now to FIG. 7A, in an exemplary embodiment, slit portions S1 and S2 are formed in the transmissive pixel electrode TE and the common electrode CE of the second substrate 200 corresponding to the transmissive pixel electrode TE as the dividing pattern. An embossed portion E1 is formed in the reflective pixel electrode RE. In an exemplary embodiment, the embossed portion E1 forms a close-packed hexagonal pattern, as shown in FIG. 7A.

In alternative exemplary embodiments, the embossed portions E1 and the slit portions S1 and S2 may be arranged differently than as shown in FIG. 7A, e.g., the embossed portions E1 and the slit portions S1 and S2 may be replaced with each other (e.g., swapped) and/or disposed in a same area. In addition, the slit portions S1 and S2 or the embossed portion E1 may be formed by patterning at least one of the transmissive pixel electrode TE, the reflective pixel electrode RE, and the common electrode CE.

Figure 7B:
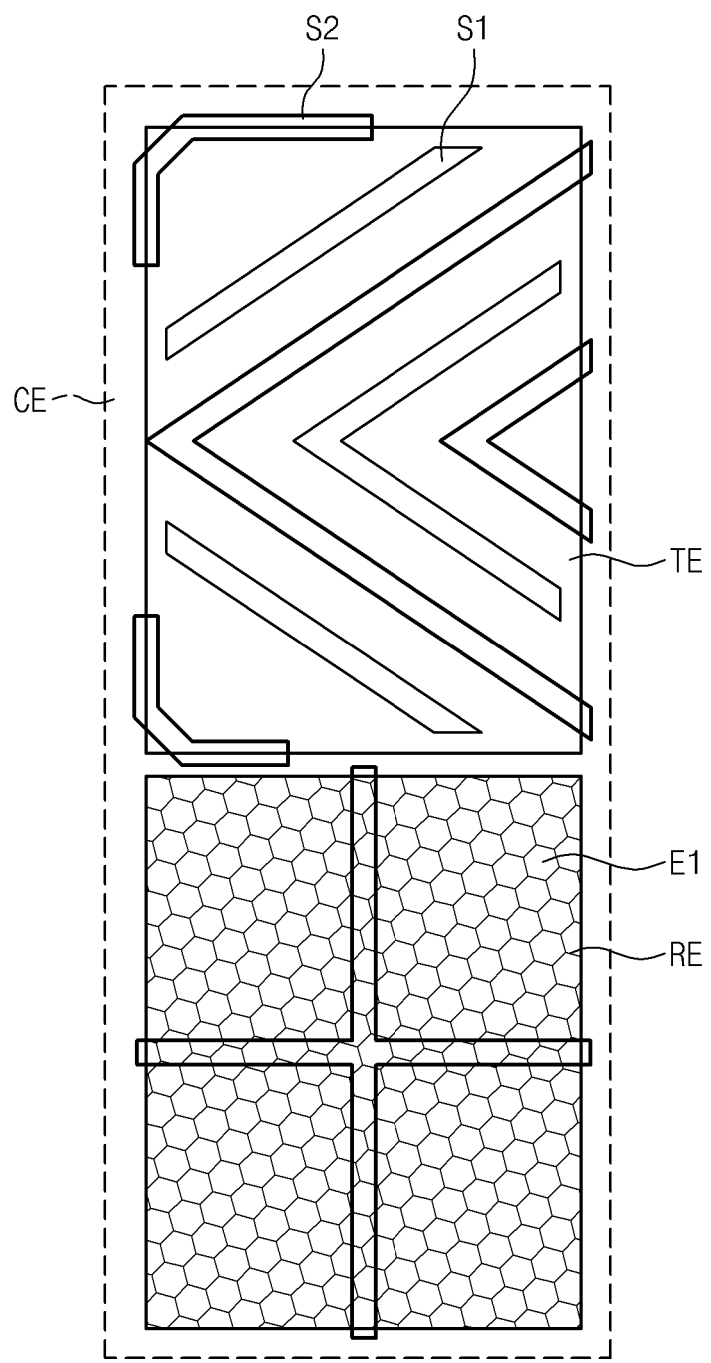

As shown in FIG. 7B, in another exemplary embodiment, the slit portions S1 and S2 or the embossed portions E1 are formed in the transmissive pixel electrode TE, the common electrode CE corresponding to the transmissive pixel electrode TE and the reflective pixel electrode RE.

Figure 7C:
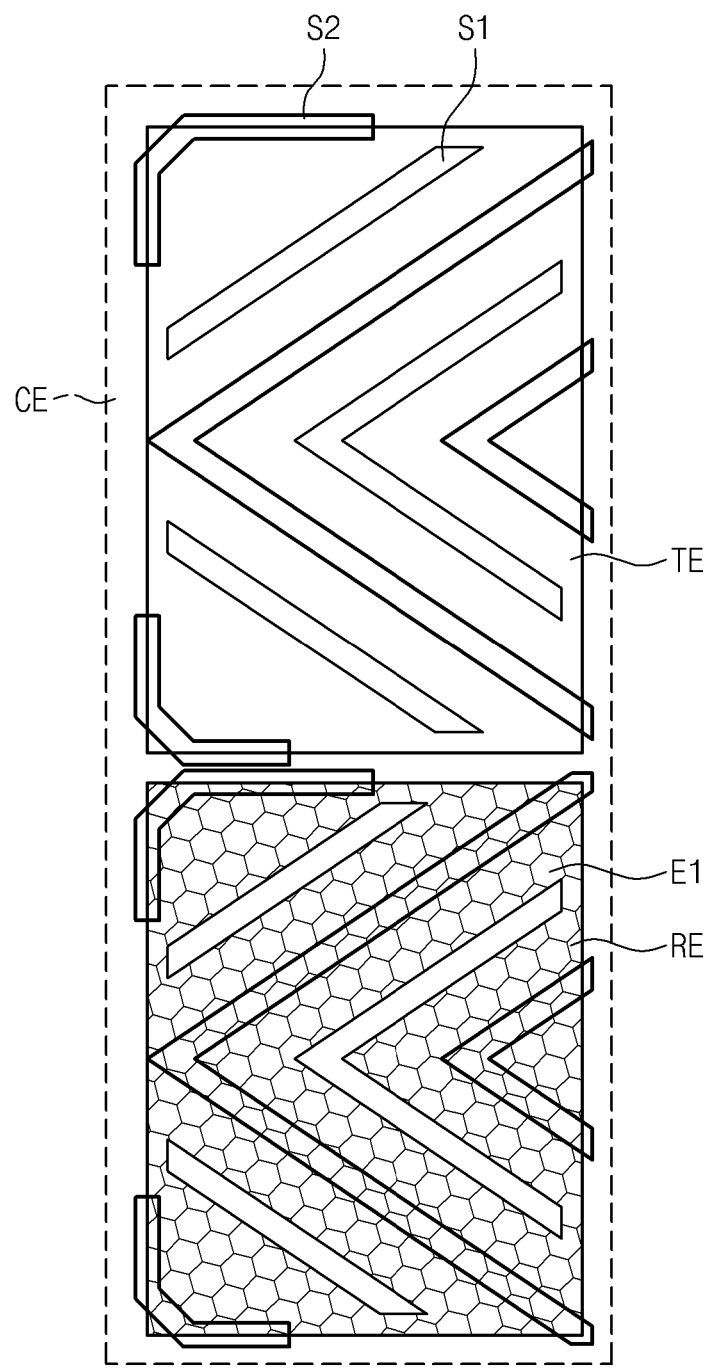

As shown in FIG. 7C, in yet another exemplary embodiment, the slit portions S1 and S2 or the embossed portions E1 are formed in the transmissive pixel electrode TE, the reflective pixel electrode RE, and the common electrode CE that corresponds to the transmissive pixel electrode TE and the reflective pixel electrode RE.

Figure 7D:
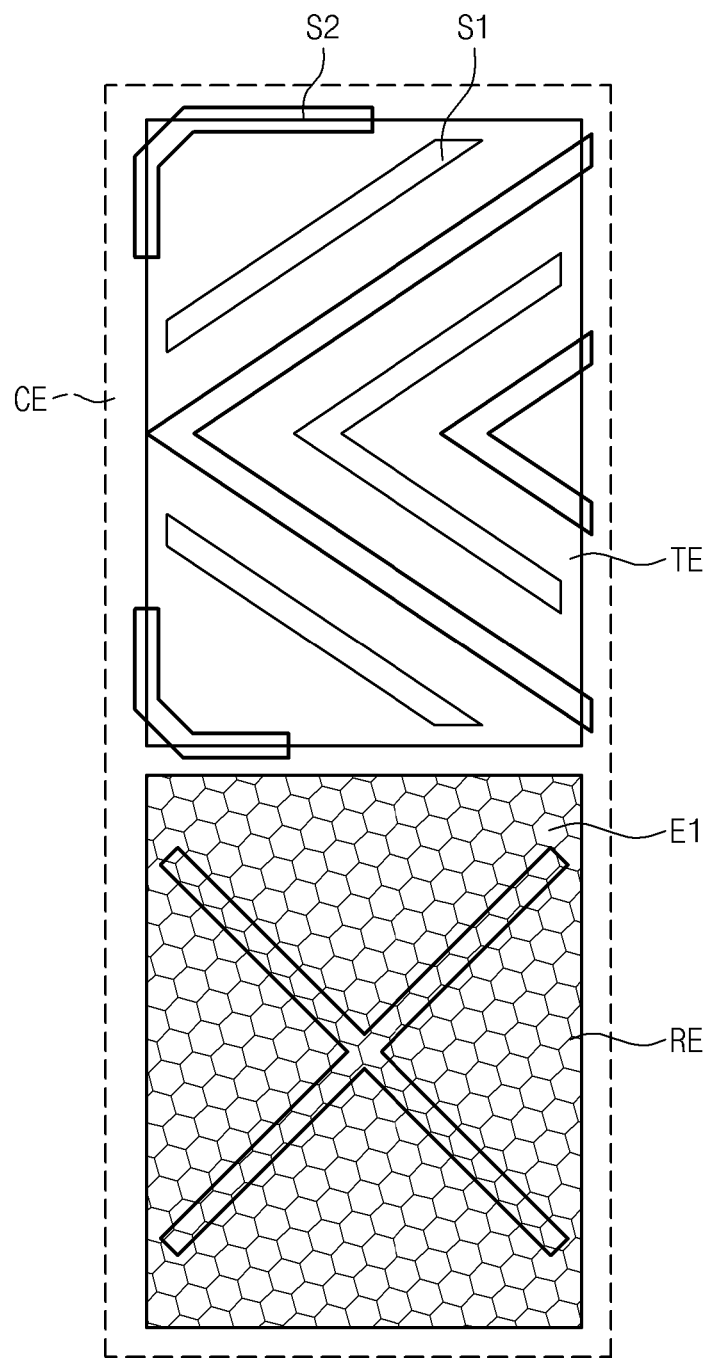

As shown in FIG. 7D, in another exemplary embodiment, the slit portions S1 and S2 or the embossed portions E1 are formed in the transmissive pixel electrode TE and the common electrode CE corresponding to the transmissive pixel electrode TE and the reflective electrode RE.

Figure 7E:
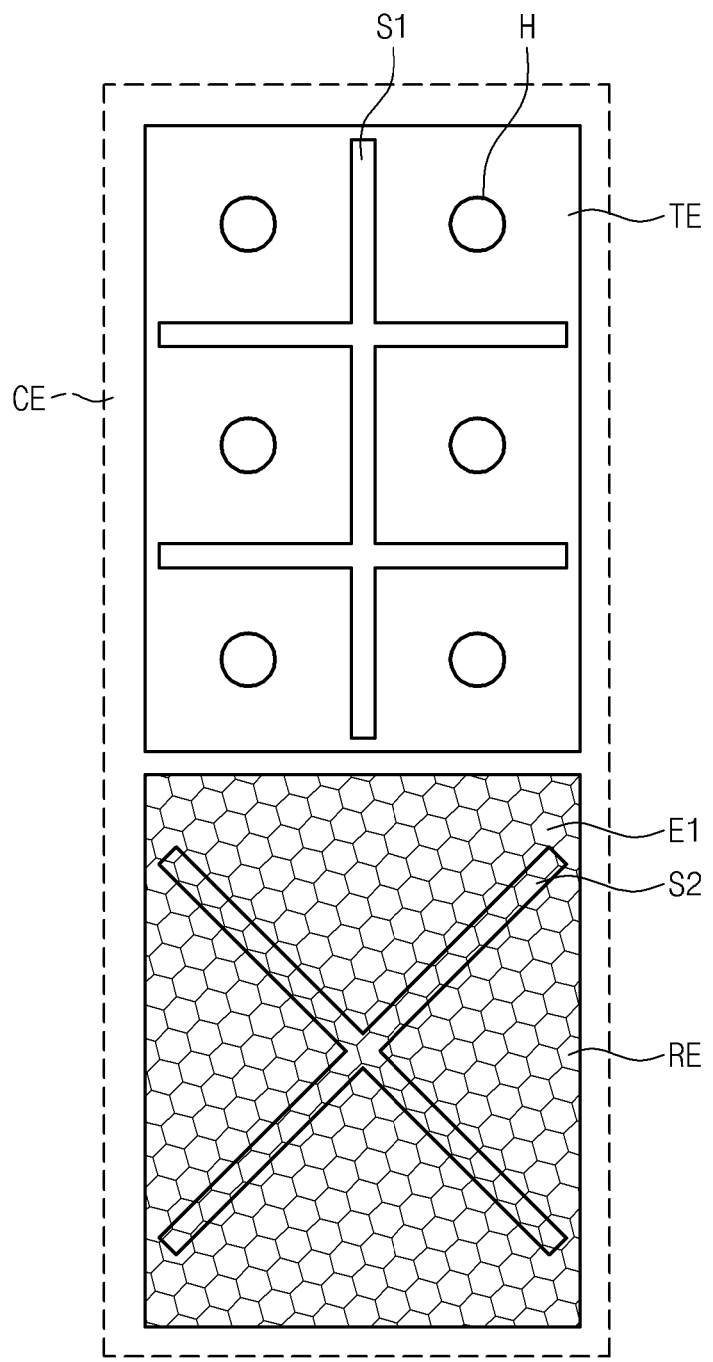

As shown in FIG. 7E, in another exemplary embodiment, the slit portions S1 and S2, or the embossed portion E1, is formed through the transmissive pixel electrode TE, a hole portion H is formed in the common electrode CE corresponding to the transmissive pixel electrode TE, and the slit portions S1 and S2 or the embossed portions E1 are formed through the common electrode CE corresponding to the reflective pixel electrode RE.

Referring now to FIGS. 7A through 7E, the dividing pattern formed in the transmissive pixel electrode TE and the reflective pixel electrode RE may be in the form of the slit portions S1 and S2. Moreover, the dividing pattern formed in the common electrode CE may be prepared in the form of the slit portions S1 and S2, as shown in FIGS. 7A through 7D, or in the form of the hole portion H, as shown in FIG. 7E. In still another exemplary embodiment, the dividing pattern, which is formed through the transmissive pixel electrode TE and the reflective pixel electrode RE, may be the form of the embossed portions E1 instead of the slit portions S1 and S2 or the hole portions H.

When the dividing pattern is in the form of the slit portions S1 and S2 in the transmissive pixel electrode TE, the reflective pixel electrode RE, and the common electrode CE, the slit portions S2 formed in the common electrode CE are arranged substantially parallel to the slit portions S1 of the transmissive pixel electrode or the reflective pixel electrode RE and positioned at an area corresponding to between the slit portions S1 of the transmissive pixel electrode TE or the reflective pixel electrode RE. The slit portions S1 of the transmissive pixel electrode TE and the common electrode CE are inclined with respect to the n-th gate line $GL_n$ or the m-th data line $DL_m$ and are symmetrical with respect to each other with reference to an imaginary line parallel to the n-th gate line $GL_n$, and the slit portions S2 of the transmissive pixel electrode TE and the common electrode CE is formed to be inclined to the n-th gate line $GL_n$ or the m-th data line $DL_m$ and is formed to be symmetrical with respect to each other with reference to an imaginary line parallel to the n-th gate line $GL_n$. As shown in FIG. 7E, when the slit portion S1 is disposed in the transmissive pixel electrode TE and the hole portion H is disposed in the common electrode CE, the slit portion S1 of the transmissive pixel electrode TE may be disposed in substantially parallel to the n-th gate line $GL_n$ and the m-th data line $DL_m$ to form a plurality of domains, and the hole portion H may be formed at a position corresponding to a center portion of each domain. In another exemplary embodiment, the hole portion H formed at the center portion of each domain may be replaced with the embossing portions E1.

A concavo-convex portion is disposed on the reflective pixel electrode RE, and a pretilt angle of the liquid crystal molecules of the liquid crystal layer is controlled by the concavo-convex portion, so that the reflective pixel electrode RE of an LCD according to an exemplary embodiment may not need the slit portions S1 and S2.

Liquid crystal molecules (not shown) of the liquid crystal layer 300 (FIG. 2) adjacent to the slit portions S1 and S2 may be tilted at a predetermined angle by the slit portions S1 and S2 of the transmissive pixel electrode TE and the common electrode CE, thereby substantially improving the viewing angle of the LCD according to an exemplary embodiment.

Figure 8A:
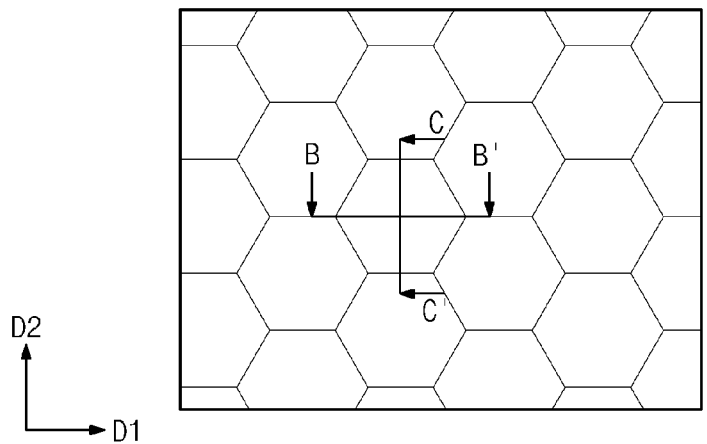
FIG. 8A is a plan view of one exemplary embodiment of an LCD according to the present invention.
Figure 8B:
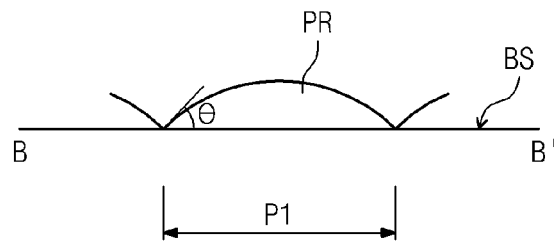
FIG. 8B is a partial cross-sectional view taken along line B-B' of FIG. 8A.
Figure 8C:
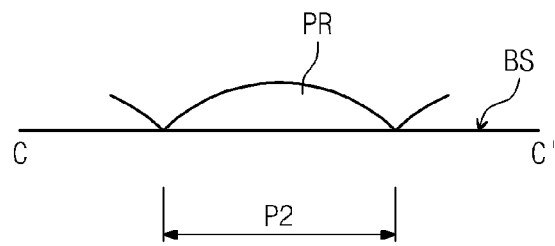
FIG. 8C is a partial cross-sectional view taken along line C-C' of FIG. 8A.

FIG. 8A is a plan view of one exemplary embodiment of an LCD according to the present invention, FIG. 8B is a partial cross-sectional view taken along line B-B' of FIG. 8A, and FIG. 8C is a partial cross-sectional view taken along line C-C' of FIG. 8A.

Referring to FIGS. 8A to 8C, the concavo-convex portion includes a base surface BS and a plurality of protrusions PR protruding from the base surface BS. The base surface BS is substantially parallel to a surface of the first insulating substrate. The protrusions PR may be arranged on the base surface BS regularly.

Each protrusion PR may be provided with a honeycomb structure in a plan view, but alternative exemplary embodiments are not limited thereto. Each protrusion PR has various shapes such as a shape of a circle, an ellipse or a polygon in a plan view.

The protrusions PR may have a same or different width when viewed in different directions in a plan view. When the protrusions PR are arranged with a regular width in one direction, the width in one direction is referred to as a pitch. The pitch may be of about 10 μm or more. In case that each of the protrusions PR has a pitch less than 10 μm, for example, about 4 μm to about 6 μm, a reflection luminance of the reflective pixel electrode RE is not enough to be bright. The reflection luminance generally increases as the pitch increases.

Referring to FIGS. 8B and 8C, the protrusions PR have different pitches when viewed in different directions in a plan view. The protrusions PR have a first pitch P1 in a first direction D1 and a second pitch P2 in a second direction D2 substantially perpendicular to the first direction D1. The first pitch P1 may be different from the second pitch P2. When the first insulating substrate is provided with a rectangular shape and the first direction D1 is substantially parallel to longer sides of the rectangular shape, the first pitch P1 may have 1.1 times or more the second pitch P2. The difference between the first pitch P1 and the second pitch P2 is to compensate for the visibility difference between the first direction D1 and the second direction D2 of the transflective LCD.

Each protrusion PR has a contact angle θ at which a surface of each protrusion PR meets the base surface BS. Each protrusion PR has the contact angle θ of about 10° to about 40°. If the contact angle θ is less than 10°, the reflection luminance difference with respect to an angle between the liquid crystal panel and an external light source such as the sun becomes larger. If the contact angle θ is more than 40°, the protrusions PR are hard to be made.

Figure 9A:
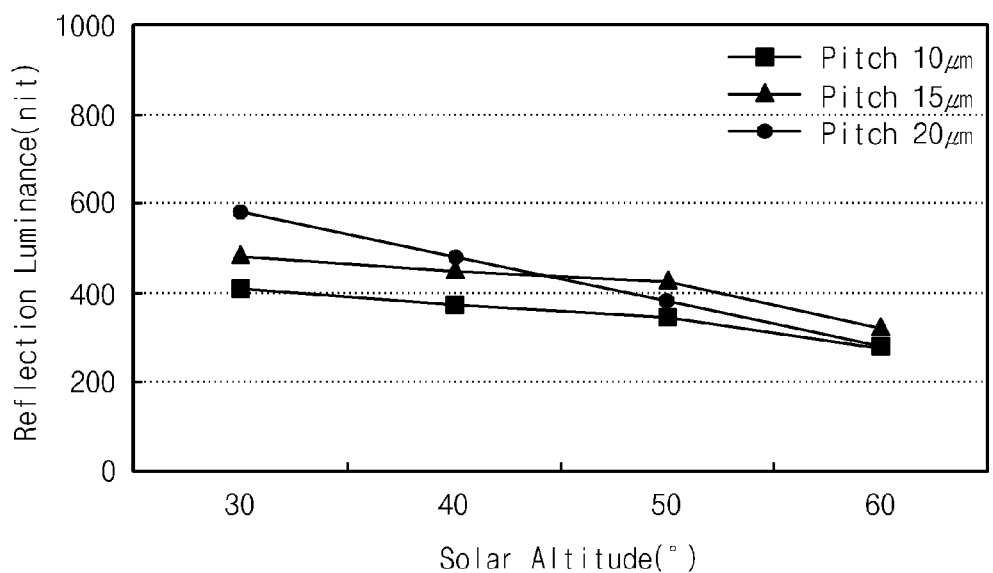
FIG. 9A is a graph showing a reflection luminance of a reflective pixel electrode according to a solar altitude when protrusions are provided with different pitches.

FIG. 9A is a graph showing a reflection luminance of a reflective pixel electrode RE according to a solar altitude when the protrusions PR are provided with a pitch of 10 μm, 15 μm, or 20 μm in one direction. The reflection luminance is measured using the Specular method. According to FIG. 9A, the reflection luminance increases as the pitch increases when the solar altitude is in a range of about 30° to about 40°.

Figure 9B:
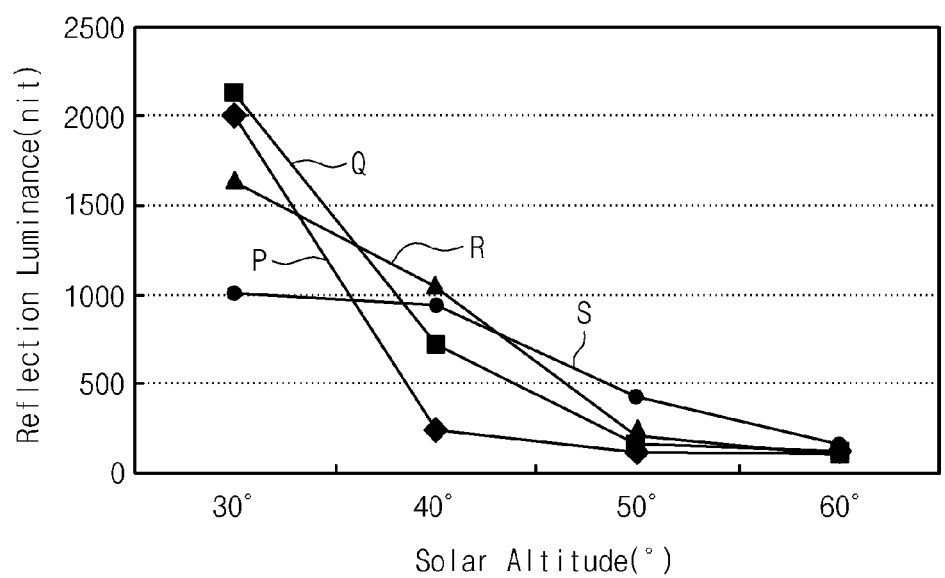
FIG. 9B is a graph showing a reflection luminance of a reflective pixel electrode according to a solar altitude when protrusions are provided with different contact angles.

FIG. 9B is a graph showing a reflection luminance of a reflective pixel electrode RE according to a solar altitude and the contact angle θ of the protrusions PR when the intensity of illumination is set to about 80,000 lux. In FIG. 9B, a graph P, a graph Q, a graph R and a graph S correspond to the contact angles θ of 10°, 11°, 12°, and 14.5°, respectively.

Referring to FIG. 9B, a decrease of the reflection luminance according to an increase of the solar altitude generally becomes larger as the contact angle θ becomes smaller. Thus, it is preferable for the protrusions PR to have the contact angle θ of 10° or more, more preferably to have the contact angle θ of 14° or more, to show a relatively uniform reflection luminance regardless of the solar altitude.

Figure 10:
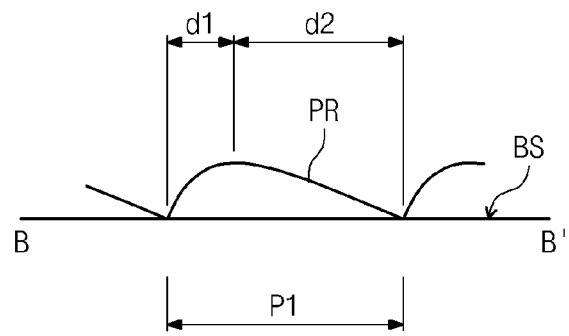
FIG. 10 is a partial cross-sectional view taken along line B-B' of FIG. 8A according to another exemplary embodiment of the present invention.

FIG. 10 is a partial cross-sectional view taken along line B-B' of FIG. 8A according to another exemplary embodiment of the present invention.

Referring to FIG. 10, the highest point of each protrusion PR does not coincide with its center in a plan view. In this case, when each protrusion PR is taken along a plane that includes the center thereon and is substantially perpendicular to a surface of the first insulating substrate, a cross-section of each protrusion PR is provided asymmetrically with respect to the center.

When each protrusion PR is taken along a plane that includes the center thereon and is substantially perpendicular to the surface of the first insulating substrate to allow each protrusion PR to have a largest pitch, the cross-section has a distance d1 from a point on the base surface BS corresponding to the highest point of each protrusion PR to one end of the each protrusion PR and a distance d2 from the point on the base surface BS corresponding to the highest point to the other end of the each protrusion PR. The distance d1 is different from the distance d2.

Because each of the protrusions PR is provided asymmetrically with respect to the center, the protrusions PR reflect the external light with different intensity in different directions according to a location of an external light source such as the solar altitude. Therefore, the reflection luminance can be maximized by adjusting surfaces of the asymmetric protrusions with respect to the location of the external light source.

Figure 11:
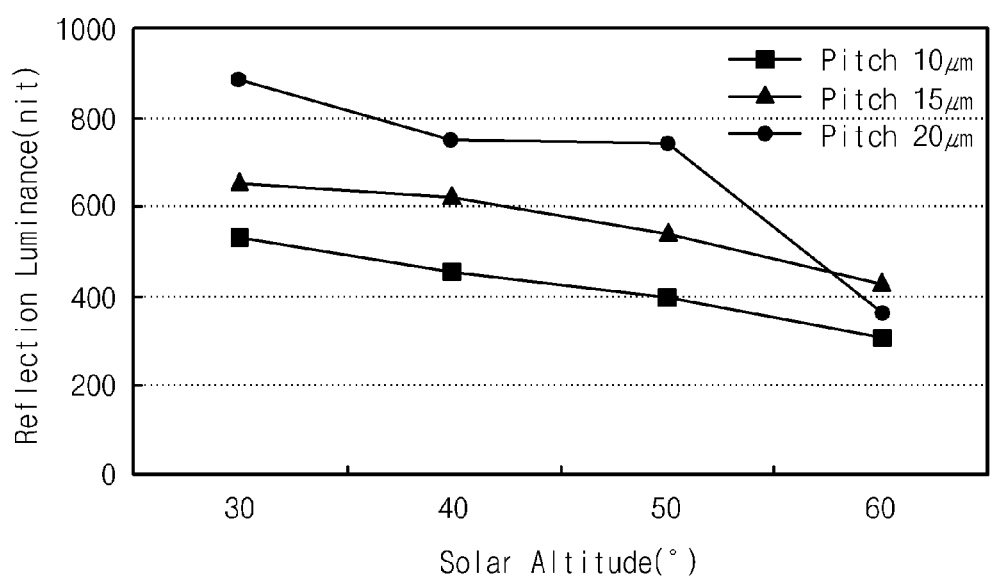
FIG. 11 is a graph showing a reflection luminance of a reflective pixel electrode according to a solar altitude when protrusions are provided with different pitches.

FIG. 11 is a graph showing a reflection luminance of a reflective pixel electrode RE according to a solar altitude when the protrusions PR are provided with a pitch of 10 μm, 15 μm, or 25 μm in one direction, d2/d1 is 1.2, and a relatively slightly inclined plane faces a direction to which the external light travels. Referring FIG. 11, the reflection luminance when each protrusion is asymmetrical is higher than that when each protrusion is symmetrical such as FIG. 9A.

As described above, the reflective pixel electrode RE having the protrusions PR gives a high visibility by adjusting the contact angle θ and the shape of the protrusions PR according to the altitude of the external light source.

Figure 12:
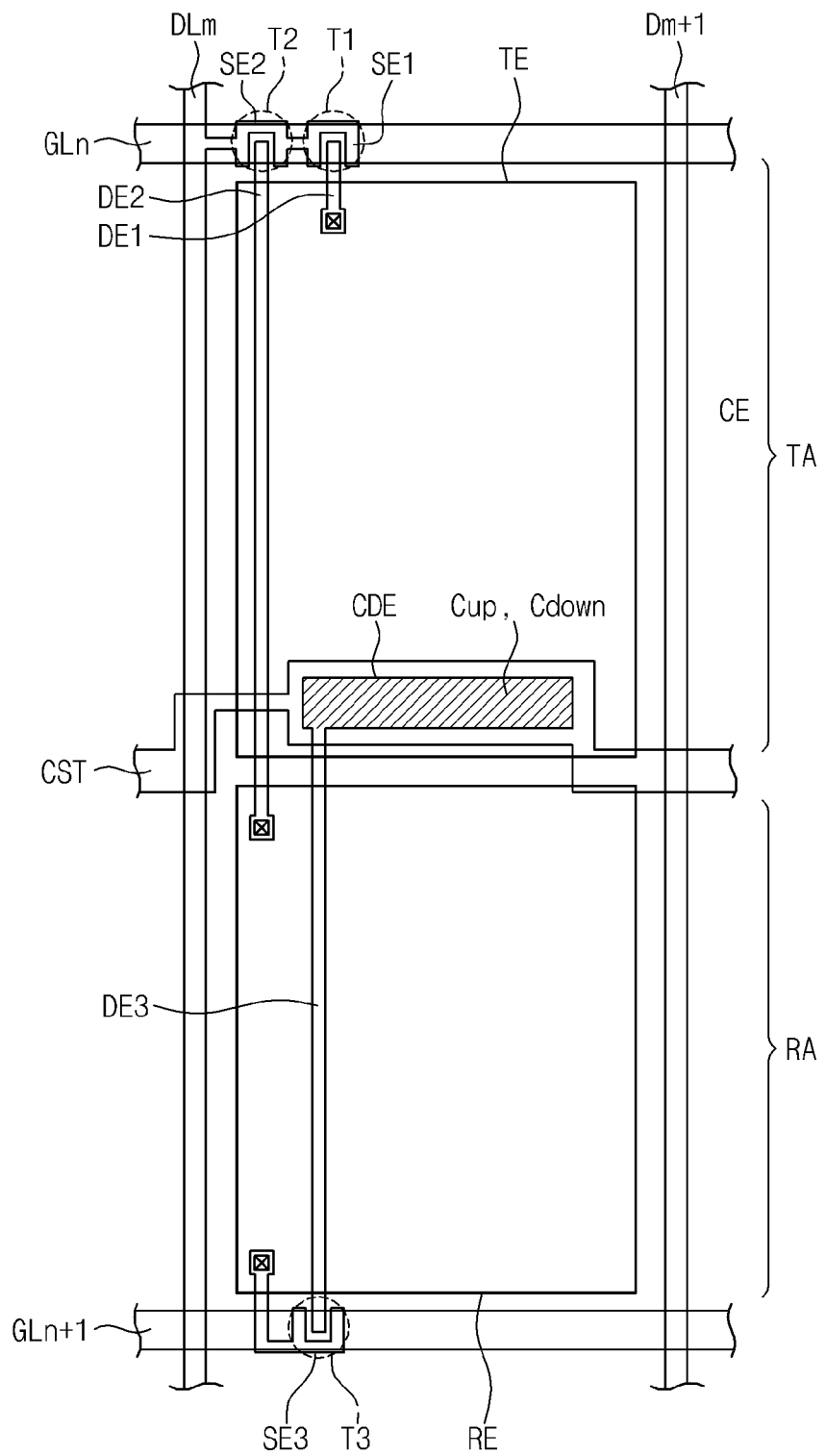
FIG. 12 is a plan view of yet another exemplary embodiment of a liquid crystal display according to the present invention.
Figure 13:
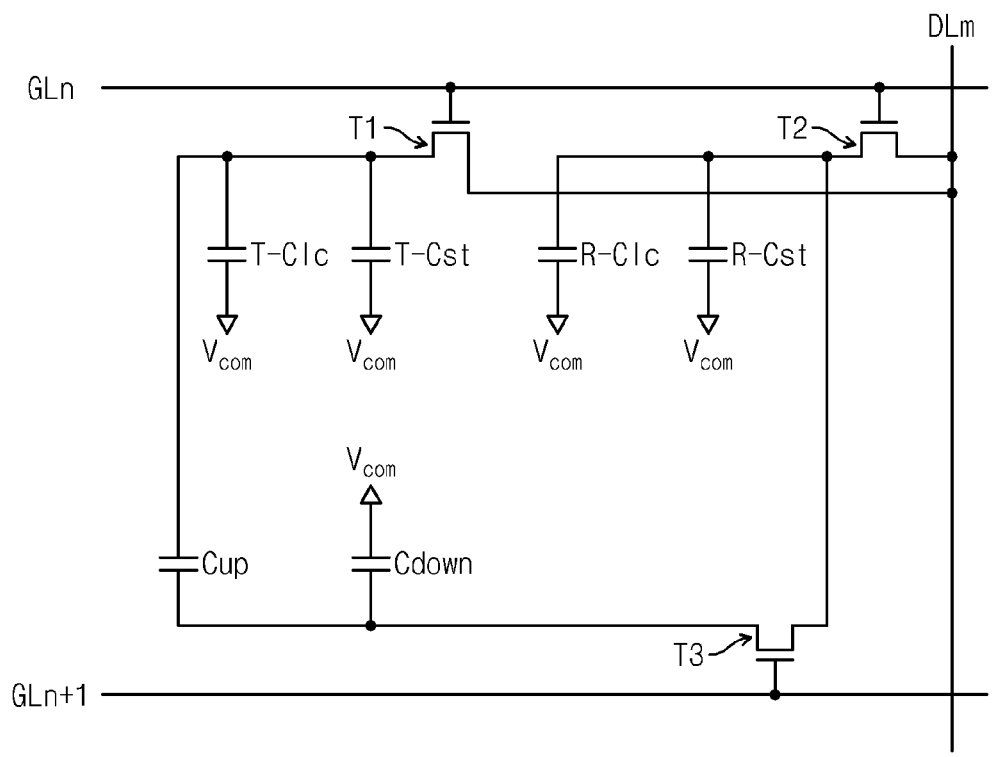
FIG. 13 is an equivalent circuit diagram of a pixel of the liquid crystal display of FIG. 12.

FIG. 12 is a plan view of yet another exemplary embodiment of an LCD according to the present invention, and FIG. 13 is an equivalent circuit diagram of a pixel of the LCD of FIG. 12. In FIGS. 12 and 13, a voltage controller is configured to have a circuit configuration different from in the additional exemplary embodiments of the voltage controller of described in greater detail above. In addition, the same reference characters have been used to refer to the same or like components throughout the drawings, and thus any repetitive detailed description will hereinafter be simplified or omitted.

Referring to FIGS. 2, 12 and 13, a voltage controller according to an exemplary embodiment includes a third thin film transistor T3 having a source electrode SE3 connected to a transmissive pixel electrode TE.

As shown in FIG. 12, n+p gate lines $GL_1, \ldots, GL_n, GL_{n+1}, \ldots, GL_{(n+p)-1}, GL_{n+p}$ and m+q data lines $DL_1, \ldots, DL_m, DL_{m+1}, \ldots, DL_{(m+q)-1}, DL_{m+q}$ are disposed on a first insulating substrate 101 (FIG. 2), and each pixel includes one gate line GL of the n+p gate lines $GL_1, \ldots, GL_n, GL_{n+1}, GL_{(n+p)-1}, GL_{n+p}$ and one data line DL of the m+q data lines $DL_1, \ldots, DL_m, DL_{m+1}, \ldots, DL_{(m+q)-1}, DL_{m+q}$. In FIG. 12, for purposes of description, a pixel including an n-th gate line $GL_n$, an (n+1)th gate line $GL_{n+1}$, and m-th data line $DL_m$ is shown and will be described in further detail, but exemplary embodiments are not limited thereto. In an exemplary embodiment, each pixel has substantially the same structure and function.

In the first substrate 100, the pixel including the n-th gate line $GL_n$, a gate electrode of the n-th gate line $GL_n$ (not specifically labeled in FIG. 12), and a storage line CST is disposed on the first insulating substrate 101 (FIG. 2).

The n-th gate line $GL_n$ extends along a first direction on the first insulating substrate 101. The (n+1)th gate line $GL_{n+1}$ is spaced apart from the n-th gate line $GL_n$ disposed substantially parallel to the n-th gate line $GL_n$ to apply a gate signal to a next pixel, e.g., an (n+1)th pixel. The gate electrode may branch from the n-th gate line $GL_n$ or (n+1)th gate line $GL_{n+1}$, or may be disposed on at least a portion of the n-th gate line $GL_n$ or (n+1)th gate line $GL_{n+1}$. The storage line CST is disposed between the n-th gate line $GL_n$ and the (n+1)th gate line $GL_{n+1}$ substantially parallel to the n-th gate line $GL_n$ and the (n+1)th gate line $GL_{n+1}$. The storage line CST is spaced apart from the n-th gate line $GL_n$ and the (n+1)th gate line $GL_{n+1}$. The storage line CST may extend along a different direction from the first direction, e.g., in a second direction substantially perpendicular to the first direction. The storage line CST is disposed in a portion of an area of the transmissive area TA and the reflective area RA.

The m-th data line $DL_m$, a first source electrode SE1, a first drain electrode DE1, a second source electrode SE2, a second drain electrode DE2, a third source electrode SE3, a third drain electrode DE3, and a charge dividing electrode CDE are arranged on the first insulating substrate 101 on which the n-th gate line $GL_n$ is formed. Since the first and second source electrodes SE1 and SE2 are connected to the m-th data line $DL_m$.

The m-th data line $DL_m$ crosses the n-th gate line $GL_n$ and the (n+1)th gate line $GL_{n+1}$ and includes an insulating layer 110 disposed therebetween, and extends along the second direction. The first source electrode SE1 and the second source electrode SE2 branch from the m-th data line $DL_m$ to partially overlap the n-th gate line $GL_n$. The first drain electrode DE1 and the second drain electrode DE2 are spaced apart from the first source electrode SE1 and the second source electrode SE2, respectively, to partially overlap the n-th gate line $GL_n$. The third source electrode SE3 partially overlaps the (n+1)th gate line $GL_{n+1}$ and is connected to a reflective pixel electrode RE that will be described later. The third drain electrode DE3 is spaced apart from the third source electrode SE3 to partially overlap the (n+1)th gate line $GL_{n+1}$. The charge dividing electrode CDE overlaps the storage line CST of the transmissive area TA.

A transmissive pixel electrode TE and a reflective pixel electrode RE are disposed on the first through third source electrodes SE1, SE2 and SE3, respectively, and the first through third drain electrodes DE1, DE2 and DE3, respectively, while the protective layer 120 is disposed therebetween. The transmissive pixel electrode TE is disposed in the transmissive area TA and connected to the first drain electrode DE1 through a contact hole formed in the protective layer 120. The reflective pixel electrode RE is disposed in the reflective area RA and is connected to the second drain electrode DE2 and the third source electrode SE3 through a contact hole formed in the protective layer 120. A first thin film transistor T1 is formed by a portion of the n-th gate line $GL_n$, the first source electrode SE1 and the first drain electrode DE1, a second thin film transistor T2 is formed by a portion of the n-th gate line GLn, the second source electrode SE2 and the second drain electrode DE2, while a third thin film transistor T3 is formed by a portion of the (n+1)th gate line GLn+1, the third source electrode SE3 and the third drain electrode DE3. The third thin film transistor T3, the charge dividing electrode CDE connected to the drain electrode DE3 of the third thin film transistor T3, and the storage line CST form the voltage controller. Referring now to FIG. 13, when a gate signal is applied to the n-th gate line $GL_n$, the first thin film transistor T1 and the second thin film transistor T2 are turned on. Thus, a data signal applied to the m-th data line $DL_m$ is provided to the transmissive pixel electrode TE of a first liquid crystal capacitor T-Clc and the reflective pixel electrode RE of a second liquid crystal capacitor R-Clc through the first thin film transistor T1 and the second thin film transistor T2. Since the signal applied to the transmissive pixel electrode TE of the first liquid crystal capacitor T-Clc is the same as the signal applied to the reflective pixel electrode RE of the second liquid crystal capacitor R-Clc, the first and second liquid crystal capacitors T-Clc and R-Clc are charged with a first pixel voltage and a second pixel voltage having the same voltage level.

The third thin film transistor T3 controls voltage levels of the first and second pixel voltages charged in the transmissive pixel electrode TE and the reflective pixel electrode RE, respectively. The third thin film transistor T3 includes a third gate electrode connected to the n-th gate line $GL_{n+1}$, the third source electrode SE3 connected to the reflective pixel electrode RE, and the third drain electrode DE3 connected to a down-capacitor Cdown and an up-capacitor Cup.

The down-capacitor Cdown is formed by the storage line CST, the charge dividing electrode CDE partially overlapped with the storage line CST and connected to the third drain electrode DE3, and the insulating layer 110 interposed between the charge dividing electrode CDE and the storage line CST. The up-capacitor Cup is formed by the transmissive pixel electrode TE, the charge dividing electrode CDE partially overlapped with the transmissive pixel electrode TE, and the protective layer 120 interposed between the charge dividing electrode CDE and the transmissive pixel electrode TE.

The third thin film transistor T3 is turned on in response to a gate signal applied to the (n+1)th gate line $GL_{n+1}$ to output a voltage control signal after the gate signal is applied to the n-th gate line $GL_n$. Then, the reflective pixel electrode RE is electrically connected to the charge dividing electrode CDE by the third thin film transistor T3. Therefore, the voltage levels of the first pixel voltage charged in the first liquid crystal capacitor T-Clc and the second pixel voltage charged in the second liquid crystal capacitor R-Clc are controlled by the up-capacitor Cup and the down-capacitor Cdown. More particularly, the voltage level of the first pixel voltage increases and the voltage level of the second pixel voltage decreases by the up-capacitor Cup and the down-capacitor Cdown. An increase and decrease in the first and second pixel voltages, respectively, depends on capacitances of the up-capacitor Cup and the down-capacitor Cdown.

Figure 14:
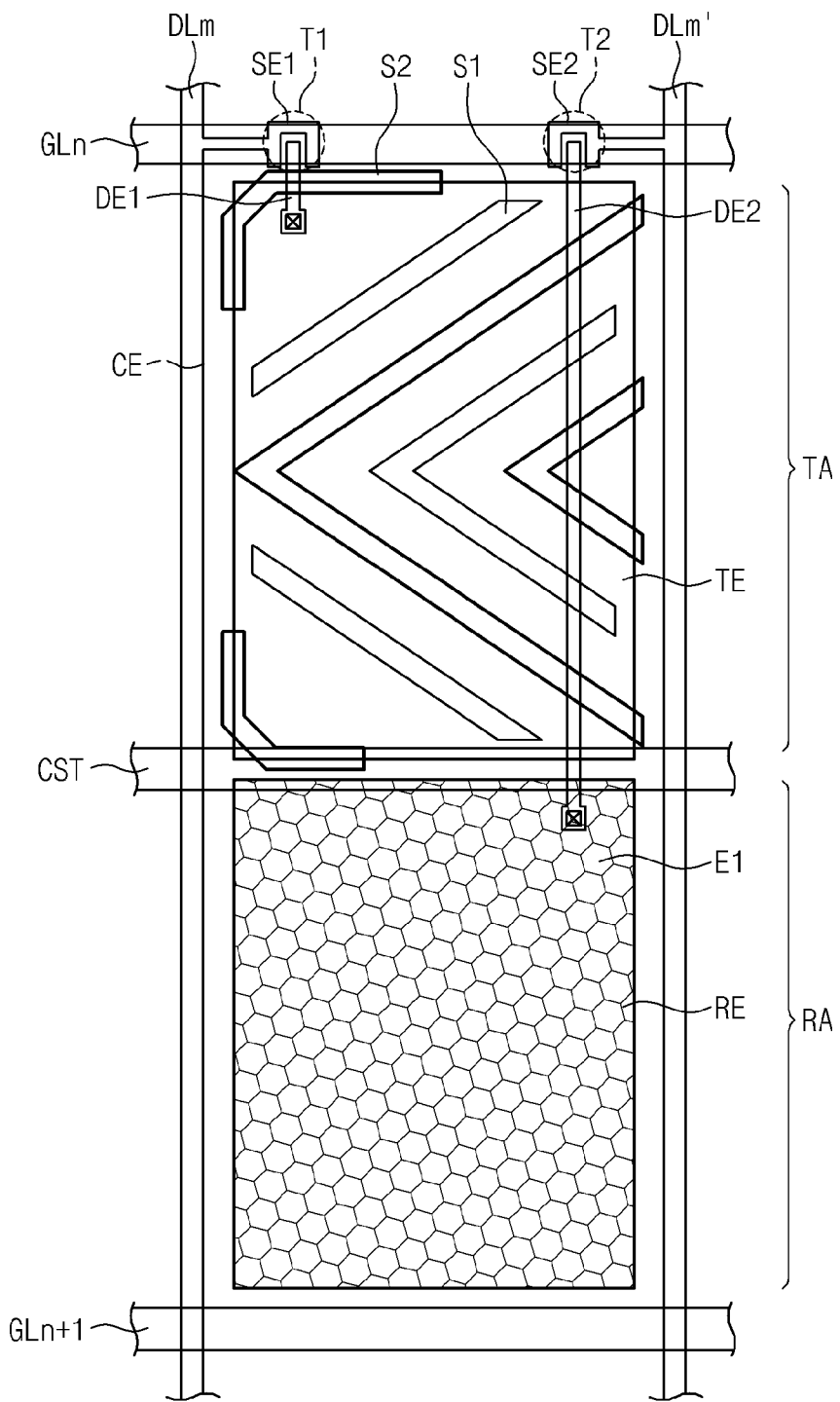
FIG. 14 is a plan view of still another exemplary embodiment of a liquid crystal display according to the present invention.

FIG. 14 is a plan view of yet another exemplary embodiment of an LCD according to the present invention. In an exemplary embodiment shown in FIG. 14, different data signals are applied to each of the transmissive pixel electrode TE and the reflective pixel electrode PE such that different voltages are applied thereto. In addition, in an exemplary embodiment, a liquid crystal layer 300 (FIG. 2) interposed between a first substrate 100 and a second substrate 200 is divided into a plurality of areas.

Hereinafter, only different elements from those of the additional exemplary embodiments described in greater detail above will be described with reference to FIGS. 1 and 14. In addition, the same reference characters in FIG. 14 denote the same or like elements in the previously-described exemplary embodiments, and thus any repetitive detailed description thereof will be omitted.

Figure 15:
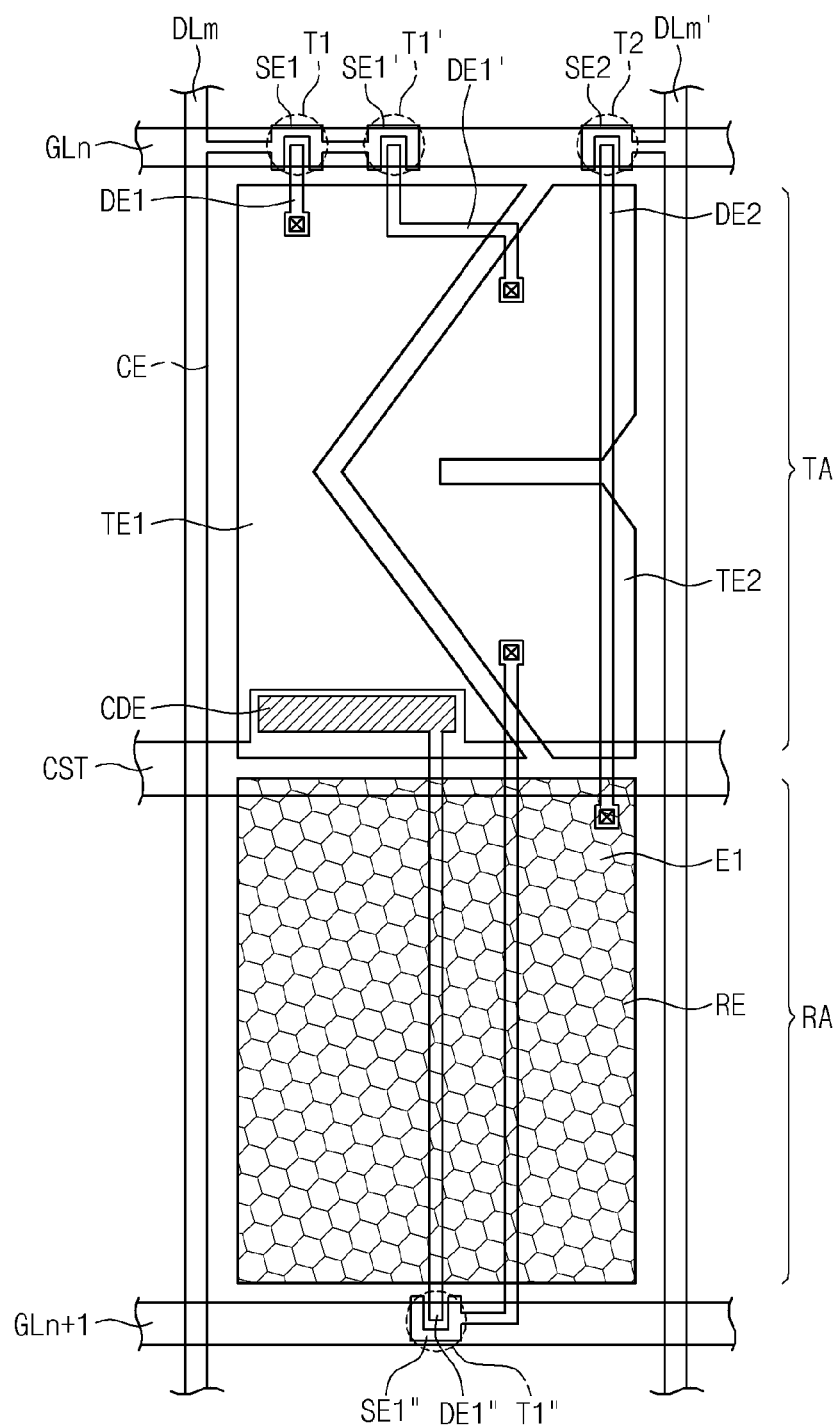
FIG. 15 is a plan view of yet an additional exemplary embodiment of a liquid crystal display according to the present invention.

The first substrate 100 includes a first insulating substrate 101 on which pixels, each having a reflective area RA and a transmissive area TA, are disposed. In an exemplary embodiment, n+p gate lines $GL_1, \ldots, GL_n, GL_{n+1}, GL_{(n+p)-1}, GL_{n+p}$, m+q data lines $DL_1, \ldots, DL_m, DL_{m+1}, \ldots, DL_{(m+q)-}, DL_{m+q}$, and m+q' sub-data lines $DL_1', \ldots, DL_m', DL_{m+1}', \ldots, DL_{(m+q)-1}', DL_{m+q}'$, which are disposed substantially parallel to and spaced apart from the m+q data lines $DL_1, \ldots, DL_m, DL_{m+1}, \ldots, DL_{(m+q)-1}, DL_{m+q}$, are disposed on the first insulating substrate 101. Each pixel includes one gate line GL of the n+p gate lines $GL_1, \ldots, GL_n, GL_{n+1}, \ldots, GL_{(n+p)-1}, GL_{n+p}$, one data line DL of the m+q data lines $DL_1, \ldots, DL_m, DL_{m+1}, \ldots, DL_{(m+q)-1}, DL_{m+q}$, and one sub-data line DL' of the sub-data lines $DL_1', \ldots, DL_m', DL_{m+1}', \ldots, DL_{(m-q)-1}', DL_{m+q}'$. In FIGS. 14 and 15, for purposes of description, a pixel including the n-th gate line GLn, the m-th data line DLm, and the m-th sub-data line $DL_m'$ is shown and will be described in greater detail herein, but alternative exemplary embodiments are not limited thereto. In an exemplary embodiment, each pixel has substantially the same structure and function.

The n-th gate line $GL_n$ extends in a first direction on the first insulating substrate 101. The m-th data line $DL_m$, the m-th sub-data line $DL_m'$, a first source electrode SE1, a first drain electrode DE1, a second source electrode SE2, a second drain electrode DE2, and a storage line CST are disposed on the first insulating substrate 101 on which the n-th gate line $GL_n$ is disposed.

The m-th data line $DL_m$ and the m-th sub-data line $DL_m'$ extend in a second direction, substantially perpendicular to the first direction, to cross the n-th gate line $GL_n$ and having an insulating layer 110 disposed therebetween.

The first source electrode SE1 and the second source electrode SE2 branch from the m-th data line $DL_m$ and the m-th sub-data line $DL_m'$, respectively, to partially overlap the n-th gate line $GL_n$. The first drain electrode DE1 and the second drain electrode DE2 are spaced apart from the first source electrode SE1 and the second source electrode SE2, respectively, to partially overlap the n-th gate line $GL_n$.

A transmissive pixel electrode TE and a reflective pixel electrode RE are disposed on the first source electrode SE1 and the second source electrode SE2 and the first drain electrode DE1 and the second drain electrode DE2, while a protective layer 120 is disposed therebetween. The transmissive pixel electrode TE is disposed in the transmissive area TA, has a transparent conductive material, and is connected to the first drain electrode DE1 through a contact hole formed through the protective layer 120. The reflective pixel electrode RE is disposed in the reflective area RA, has a non-transparent conductive material, and is connected to the second drain electrode DE2 through a contact hole formed through the protective layer 120.

The reflective pixel electrode RE may have a concavo-convex portion disposed on a surface thereof to increase a reflectance of the same. The concavo-convex portion may be integrally formed with the reflective pixel electrode RE and/or may be formed by patterning the protective layer 120 disposed under the reflective pixel electrode RE.

A second substrate 200 includes a second insulating substrate 201, and a transparent organic layer 220, a light-blocking layer 211, a color filter layer 210 and a common electrode CE are disposed on the second insulating substrate 201.

At least one dividing pattern is formed in one of the transmissive pixel electrode TE, the reflective pixel electrode RE and the common electrode CE to divide a liquid crystal layer 300 into domains. Each domain may have a same area or a different area. The dividing pattern is formed to have a slit shape (hereinafter, referred to as slit portions S1 and S2) to control an alignment direction of the liquid crystal layer 300. In an exemplary embodiment, the slit portions S1 and S2 are formed in the transmissive pixel electrode TE and the common electrode CE; however it will be noted that alternative exemplary embodiments are not limited thereto or thereby. For example, the slit portions S1 and S2 may be disposed in the reflective pixel electrode RE. In addition, the dividing pattern may have an embossed shape and/or a hole shape.

Thus, in an exemplary embodiment, a portion of the n-th gate line $GL_n$, the first source electrode SE1, and the first drain electrode DE1 form a first thin film transistor T1, and a portion of the n-th gate line $GL_n$, a second source electrode SE2, and a second drain electrode DE2 form a second thin film transistor T2.

Referring to FIG. 14, when a gate signal is applied to the n-th gate line $GL_n$, the first thin film transistor T1 and the second thin film transistor T2 are turned on in response to the gate signal to output a first data signal and a second data signal, respectively. Thus, the first data signal applied to the m-th data line $DL_m$ is applied to the transmissive pixel electrode TE through the first thin film transistor T1 to charge the transmissive pixel electrode TE, and the second data signal applied to the m-th sub-data line $DL_m'$ is applied to the reflective pixel electrode RE through the second thin film transistor T2 to charge the reflective pixel electrode RE. In this case, since the m-th data line $DL_m$ and the m-th sub-data line $DL_m'$ may apply different data signals from each other, a first pixel voltage and a second pixel voltage having different voltage levels may be applied to the transmissive pixel electrode TE and the reflective pixel electrode RE, respectively.

As described above, since different voltages are applied to the transmissive pixel electrode TE and the reflective pixel electrode RE, alignment angles of liquid crystal molecules included in the liquid crystal layer 300 corresponding to the transmissive area TA and the reflective area RA are controlled differently from one another. As a result, a phase retardation value of light passing through the liquid crystal layer 300 of the transmissive pixel electrode TE may be substantially the same as a phase retardation value of light passing through the liquid crystal layer 300 of the reflective pixel electrode RE. Accordingly, a gray-scale of the transmissive area TA is matched with a gray-scale of the reflective area RA in an LCD having a signal cell gap. In addition, the dividing pattern is disposed in the transmissive pixel electrode TE and the reflective pixel electrode RE to form the domains, thereby substantially improving a side visibility and greatly widening a viewing angle of the LCD.

FIG. 15 is a plan view of still another exemplary embodiment of an LCD according to the present invention. In an exemplary embodiment, different data signals are applied to a transmissive pixel electrode TE and a reflective pixel electrode RE to provide different voltages to the transmissive pixel electrode TE and the reflective pixel electrode RE, thereby providing a transflective LCD with a single cell gap. In addition, in an exemplary embodiment, the transmissive pixel electrode TE may be divided into two areas, to which different pixel voltages are applied, and a liquid crystal layer 300 interposed between a first substrate 100 and a second substrate 200 is divided into a plurality of domains.

Hereinafter, only different elements from those of previously-described additional exemplary embodiments will be described in further detail with reference to FIGS. 1 and 15. In addition, the same reference characters in FIG. 14 denote the same or like elements in the previous drawings, and thus any repetitive detailed description thereof will be omitted.

A first substrate 100 includes a first insulating substrate 101 on pixels, each having a reflective area RA and a transmissive area TA, are formed. n+p gate lines $GL_1, \ldots, GL_n$, $GL_{n+1}, GL_{(n+p)-1}, GL_{n+p}$, m+q data lines $DL_1, \ldots, DL_m$, $DL_{m+1}, \ldots, DL_{(m+q)-1}, DL_{m+q}$, and m+q' sub-data lines $DL_1', \ldots, DL_m', DL_{m+1}', \ldots, DL_{(m+q)-1}', DL_{m+q}'$ that are substantially parallel to and spaced apart from the M data lines $DL_1, \ldots, DL_m, DL_{m+1}, \ldots, DL_{(m+q)-1}, DL_{m+q}$ are disposed on the first insulating substrate 101. Each pixel includes one gate line GL of the n+p gate lines $GL_1, \ldots, GL_n$, $GL_{n+1}, \ldots, GL_{(n+p)-1}, GL_{n+p}$, one data line DL of the m+q data lines $DL_1, \ldots, DL_m, DL_{m+1}, \ldots, DL_{(m+q)-1}, DL_{m+q}$, and one sub-data line DL' of the m'+q sub-data lines $DL_1', \ldots, DL_m', DL_{m+1}', \ldots, DL_{(m+q)-1}', DL_{m+q}'$. In FIG. 15, for purposes of description, a pixel including the n-th gate line $GL_n$, the m-th data line $DL_m$, and the m-th sub-data line $DL_m'$ has been illustrated with the (n+1)th gate line $GL_{n+1}$ of a next pixel adjacent to the pixel, but alternative exemplary embodiments are not limited thereto. In an exemplary embodiment, each pixel has substantially the same structure and function.

The n-th gate line $GL_1$, extends along a first direction on the first insulating substrate 101. The m-th data line $DL_m$, the m-th sub-data line $DL_m'$, a first source electrode SE1, a first drain electrode DE1, a first sub-source electrode SE1', a first sub-drain electrode DE1', a second sub-source electrode SE1", a second sub-drain electrode DE1", a second source electrode SE2, a second drain electrode DE2, and a charge dividing electrode CDE are disposed on the first insulating substrate 101 on which the n-th gate line $GL_1$, is disposed.

A storage line CST is arranged substantially parallel to the n-th gate line $GL_n$ and the (n+1)th gate line $GL_{n+1}$, positioned between the n-th gate line $GL_n$ and the (n+1)th gate line $GL_{n+1}$, and spaced apart from the n-th gate line $GL_n$ and the (n+1)th gate line $GL_{n+1}$1. A portion of the storage line CST may branch therefrom along a second direction substantially perpendicular to the first direction. The storage line CST may be disposed in both areas of the transmissive area TA and the reflective area RA.

The first source electrode SE1 and the first sub-source electrode SE1' branch from the m-th data line $DL_m$ to partially overlap the n-th gate line $GL_n$. The second source electrode SE2 branches from the m-th sub-data line $DL_m'$ to partially overlap the n-th gate line $GL_n$.

The first drain electrode DE1 and the first sub-drain electrode DE1' are spaced apart from the first source electrode SE1 and the first sub-source electrode SE1' to partially overlap the n-th gate line $GL_n$. The second drain electrode DE2 is spaced apart from the second source electrode SE2 to partially overlap the n-th gate line $GL_n$.

A transmissive pixel electrode TE and a reflective pixel electrode RE are disposed on the first source electrode SE1, the first sub-source electrode SE1' and the second source electrode SE2 and the first drain electrode DE1, the first sub-drain electrode DE1' and the second drain electrode DE2, and a protective layer 120 is disposed therebetween. The transmissive pixel electrode TE is disposed in the transmissive area TA, includes a transparent conductive material, and the transmissive pixel electrode TE further includes a first transmissive pixel electrode TE1 and a second transmissive pixel electrode TE2 spaced apart from and insulated from the first transmissive pixel electrode TE1. The first transmissive pixel electrode TE1 is connected to the first drain electrode DE1 through a contact hole formed through the protective layer 120. The second transmissive pixel electrode TE2 is connected to the first sub-drain electrode DE1' through a contact hole formed in the protective layer 120.

The second sub-source electrode SE1" is connected to the second transmissive pixel electrode TE2 through a contact hole and partially overlaps with the (n+1)th gate line $GL_{n+1}$. The second sub-drain electrode DE1" is spaced apart from the second sub-source electrode SE1" to partially overlap the (n+1)th gate line $GL_{n+1}$.

The charge dividing electrode CDE is connected to the second sub-drain electrode DE1" and partially overlaps the first transmissive pixel electrode TE1 and the storage line CST. The charge dividing electrode CDE forms a down-capacitor Cdown with the storage line CST with an insulating layer 110 disposed therebetween, and forms an up-capacitor Cup with the first transmissive pixel electrode TE1 with the insulating layer 110 disposed therebetween.

A second substrate 200 includes a second insulating substrate 201, and a transparent organic layer 220, a light-blocking layer 211, a color filter layer 210 and a common electrode CE are disposed on the second insulating substrate 201.

At least one dividing pattern is formed in at least one of the first transmissive pixel electrode TE1, the second transmissive pixel electrode TE2, the reflective pixel electrode RE and the common electrode CE to divide the liquid crystal layer 300 into domains. The domains may be divided into the same area or different areas. The dividing pattern is formed in at least one of the first transmissive pixel electrode TE1, the second transmissive pixel electrode TE2, the reflective pixel electrode RE and the common electrode CE, and the dividing pattern may have a slit shape (hereinafter referred to as a slit portion), an embossed shape (hereinafter referred to as an embossed portion), or a hole shape (hereinafter referred to as a hole portion). In an exemplary embodiment, a structure in which the slit portion is disposed in the transmissive pixel electrode TE, has been shown and will be described in further detail; however it will be noted that alternative exemplary embodiments are not be limited thereto or thereby. For example, the slit portion may be formed in the reflective pixel electrode RE or the common electrode, and the dividing pattern may be replaced by an embossed portion or a hole portion.

In an exemplary embodiment, a portion of the n-th gate line $GL_n$, the first source electrode SE1, and the first drain electrode DE1 form a first thin film transistor T1. A portion of the n-th gate line $GL_n$, the first sub-source electrode SE1', and the first sub-drain electrode DE1' form a first sub-thin film transistor T1'. A portion of the (n+1)th gate line $GL_{n+1}$, the second sub-source electrode SE1", and the second sub-drain electrode DE1" form a second sub-thin film transistor T1'. A portion of the n-th gate line $GL_n$, the second source electrode SE2, and the second drain electrode DE2 form a second thin film transistor T2.

Referring to FIG. 15, when a gate signal is applied to the n-th gate line $GL_n$, the first thin film transistor T1 and the second thin film transistor T2 are turned on in response to the gate signal to output a first data signal and a second data signal, respectively. Then, the first data signal applied to the m-th data line $DL_m$ is provided to the transmissive pixel electrode TE through the first thin film transistor T1 and charged in the transmissive pixel electrode TE, and the second data signal applied to the m-th sub-data line $DL_m'$ is provided to the reflective pixel electrode RE through the second thin film transistor T2 and charged in the reflective pixel electrode RE. Since the m-th data line $DL_m$ and the m-th sub-data line $DL_m'$ may transmit different data signals, a first pixel voltage and a second pixel voltage having different voltage levels may be applied to the transmissive pixel electrode TE and the reflective pixel electrode RE, respectively.

When the gate signal is applied, the first thin film transistor T1 and the first sub-thin film transistor T1' are turned on in response to the gate signal to output the first data signal and a first sub-data signal, respectively. Accordingly, the first data signal and the first auxiliary data signal are applied to the first transmissive pixel electrode TE1 and the second transmissive pixel electrode TE2, respectively, and are thereafter charged into the first transmissive pixel electrode TE1 and the second transmissive pixel electrode TE2, respectively. The signals applied to the first transmissive pixel electrode TE1 and the second transmissive pixel electrode TE2 are substantially identical, and thus a first liquid crystal capacitor and a second liquid crystal capacitor corresponding to the first transmissive pixel electrode TE1 and the second transmissive pixel electrode TE2, respectively, are charged with a first transmissive pixel voltage and a second transmissive pixel voltage having the same voltage level.

The second sub-thin film transistor T1' is turned on in response to a gate signal applied to the (n+1)th gate line $GL_{n+1}$ to output a voltage control signal after the gate signal is applied to the n-th gate line $GL_n$. Thus, the second transmissive pixel electrode TE2 is electrically connected to the charge dividing electrode CDE by the second sub-thin film transistor T1'. Then, the voltage levels of the first transmissive pixel voltage charged in the first liquid crystal capacitor and the second transmissive pixel voltage charged in the second liquid crystal capacitor may be controlled by the up-capacitor Cup and the down-capacitor Cdown. More particularly, the voltage level of the first transmissive pixel voltage increases by the up-capacitor Cup, and the voltage level of the second transmissive pixel voltage decreases by the down-capacitor Cdown.

An increase and a decrease in the first and second transmissive pixel voltages depend on capacitances of the up-capacitor Cup and the down-capacitor Cdown. Therefore, different voltages may be applied to the first transmissive pixel electrode TE1 and the second transmissive pixel electrode TE2 by forming a voltage controller.

As described herein, a signal cell gap LCD is achieved by dividing a transmissive pixel electrode TE into first and second transmissive pixel electrodes TE1 and TE2, respectively, and applying different pixel voltages to the first and second transmissive pixel electrodes TE1 and TE2. In addition, liquid crystal molecules may be aligned at different angles from each other, to thereby substantially improve side visibility and provide a wide viewing angle.

Thus, since the different pixel voltages are applied to the transmissive pixel electrode TE and the reflective pixel electrode RE, the liquid crystal molecules included in the liquid crystal layer 300 corresponding to the transmissive area TA and the reflective area RA are controlled to have different alignment angles from each other. As a result, a phase retardation value of light traveling through the liquid crystal layer 300 corresponding to the transmissive pixel electrode TE has substantially the same phase retardation value of light traveling through the liquid crystal layer 300 corresponding to the reflective pixel electrode RE, and a gray-scale of the transmissive area TA is thereby matched with a gray-scale of the reflective area RA in an LCD with a signal cell gap. In one or more exemplary embodiments, a next gate line for the next pixel may be used instead of forming the sub-gate lines for corresponding pixels.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A method of manufacturing a liquid crystal display, the method comprising:
    forming a first substrate comprising pixels, each of which includes a transmissive area and a reflective area;
    forming a second substrate opposite to the first substrate; and
    forming a liquid crystal layer between the first substrate and the second substrate,
    wherein the forming the first substrate comprises:
    forming a first thin film transistor, a second thin film transistor, and a third thin film transistor on a first insulating substrate disposed on the first substrate;
    forming a transmissive pixel electrode, connected to the first thin film transistor, in the transmissive area and;
    forming a reflective pixel electrode, connected to the second thin film transistor, in the reflective area; and
    forming a voltage controller having a charge dividing electrode overlapping at least a portion of the transmissive pixel electrode, a protective layer is interposed between the charge dividing electrode and the at least a portion of the transmissive pixel electrode.

2. The method of claim 1, wherein a cell gap of the reflective area is greater than or equal to a cell gap of the transmissive area such that transmissive area and the reflective area effectively have a single cell gap.

3. The method of claim 2, wherein the forming the first thin film transistor, the second thin film transistor and the third thin film transistor comprises:
    forming a first gate line and a second gate line on the first substrate;
    forming a data line which crosses the first gate line and the second gate line on the first substrate;
    interposing a gate insulating layer between the data line and each of the first gate line and the second gate line;
    forming the first thin film transistor and the second thin film transistor connected to the first gate line and the data line, respectively; and
    forming the third thin film transistor connected to a drain electrode of the second thin film transistor and the second gate line.

4. The method of claim 3, wherein the forming the voltage controller comprises:
    forming a storage line, spaced apart from and insulated from the first gate line and the second gate line, on the first substrate;
    forming the charge dividing electrode, connected to the third thin film transistor and which overlaps at least a portion the storage line, on the first substrate; and interposing the gate insulating layer between the charge dividing electrode and the storage line.

5. The method of claim 4, wherein the preparing the second substrate comprises:

forming a common electrode, configured to form an electric field with the transmissive pixel electrode and the reflective pixel electrode, on a second insulating layer; and forming at least one dividing pattern in the common electrode, wherein the forming the first substrate further comprises forming at least one dividing pattern in at least one of the transmissive pixel electrode and the reflective pixel electrode.

6. The method of claim 1, wherein the forming the first thin film transistor, the second thin film transistor and the third thin film transistor comprises:

forming a first gate line and a second gate line on the first substrate;

forming a data line which crosses the first gate line and the second gate line on the first substrate;

interposing a gate insulating layer between the data line and both the first gate line and the second gate line; and connecting the first thin film transistor and the second thin film transistor to the first gate line and the data line; and connecting the third thin film transistor to the transmissive pixel electrode and the second gate line.

7. The method of claim 6, wherein the forming the voltage controller comprises:

forming a storage line, spaced apart from and insulated from the first gate line and the second gate line, on the first substrate;

forming a charge dividing electrode, connected to the third thin film transistor and which overlaps at least a portion of the storage line, on the first substrate; and interposing the gate insulating layer between the charge dividing electrode and the storage line.

8. The method of claim 7, wherein the charge dividing electrode overlaps at least a portion of the transmissive pixel electrode, and a protective layer is interposed between the charge dividing electrode and the at least a portion of the transmissive pixel electrode.

9. The method of claim 6, wherein the forming the second substrate comprises:

forming a common electrode, configured to form an electric field with the transmissive pixel electrode and the reflective pixel electrode, on a second insulating layer; and forming at least one dividing pattern in the common electrode, wherein the forming the first substrate further comprises forming at least one dividing pattern in at least one of the transmissive pixel electrode and the reflective pixel electrode.

* * * * *